US009589222B2

United States Patent
Nakamura et al.

(10) Patent No.: US 9,589,222 B2
(45) Date of Patent: Mar. 7, 2017

(54) NON-TRANSITORY STORAGE MEDIUM ENCODED WITH COMPUTER READABLE INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto-shi, Kyoto (JP)

(72) Inventors: Masahiro Nakamura, Kyoto (JP); Keiichiro Yoshida, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/843,312

(22) Filed: Sep. 2, 2015

(65) Prior Publication Data

US 2016/0247055 A1 Aug. 25, 2016

(30) Foreign Application Priority Data

Feb. 19, 2015 (JP) ................. 2015-030513

(51) Int. Cl.
| | |
|---|---|
| H04Q 5/22 | (2006.01) |
| G06K 19/07 | (2006.01) |
| A63F 13/42 | (2014.01) |
| A63F 13/235 | (2014.01) |
| H04B 5/00 | (2006.01) |

(52) U.S. Cl.
CPC ........ *G06K 19/0723* (2013.01); *A63F 13/235* (2014.09); *A63F 13/42* (2014.09); *H04B 5/0062* (2013.01)

(58) Field of Classification Search
CPC .............. G06K 19/0723; H04B 5/0062; A63F 13/235; A63F 13/42

USPC ................................................ 340/10.1–10.3
See application file for complete search history.

(56) References Cited

U.S. PATENT DOCUMENTS

| | | | | |
|---|---|---|---|---|
| 7,891,544 | B2 * | 2/2011 | Nakatsugawa | G06Q 20/32 235/375 |
| 8,960,531 | B2 * | 2/2015 | Nakatsugawa | G06Q 20/32 235/375 |
| 2013/0324262 | A1 * | 12/2013 | Shimohata | H04W 4/008 463/42 |

FOREIGN PATENT DOCUMENTS

| | | |
|---|---|---|
| EP | 2 752 227 | 7/2014 |
| JP | 2002-325972 A | 11/2002 |
| JP | 2003-135846 A | 5/2003 |
| JP | 2009-006004 | 1/2009 |
| JP | 2013-251816 A | 12/2013 |
| WO | WO 2012/033863 | 3/2012 |

OTHER PUBLICATIONS

European Search Report dated Feb. 10, 2016, issued in corresponding European Application No. 15184149.1 (7 pages).

* cited by examiner

*Primary Examiner* — Qutbuddin Ghulamali
(74) *Attorney, Agent, or Firm* — Nixon & Vanderhye P.C.

(57) ABSTRACT

A non-transitory storage medium encoded with a computer readable information processing program executed by a computer with a near field wireless communication function is provided. The information processing program causes the computer to perform the steps of exchanging data with any proximate information storage medium and proceeding with game processing in accordance with a time difference between predetermined timing and one of timing at which exchange of data with the information storage medium is enabled and timing at which exchange of data with the information storage medium is disabled.

20 Claims, 15 Drawing Sheets

FIG.3
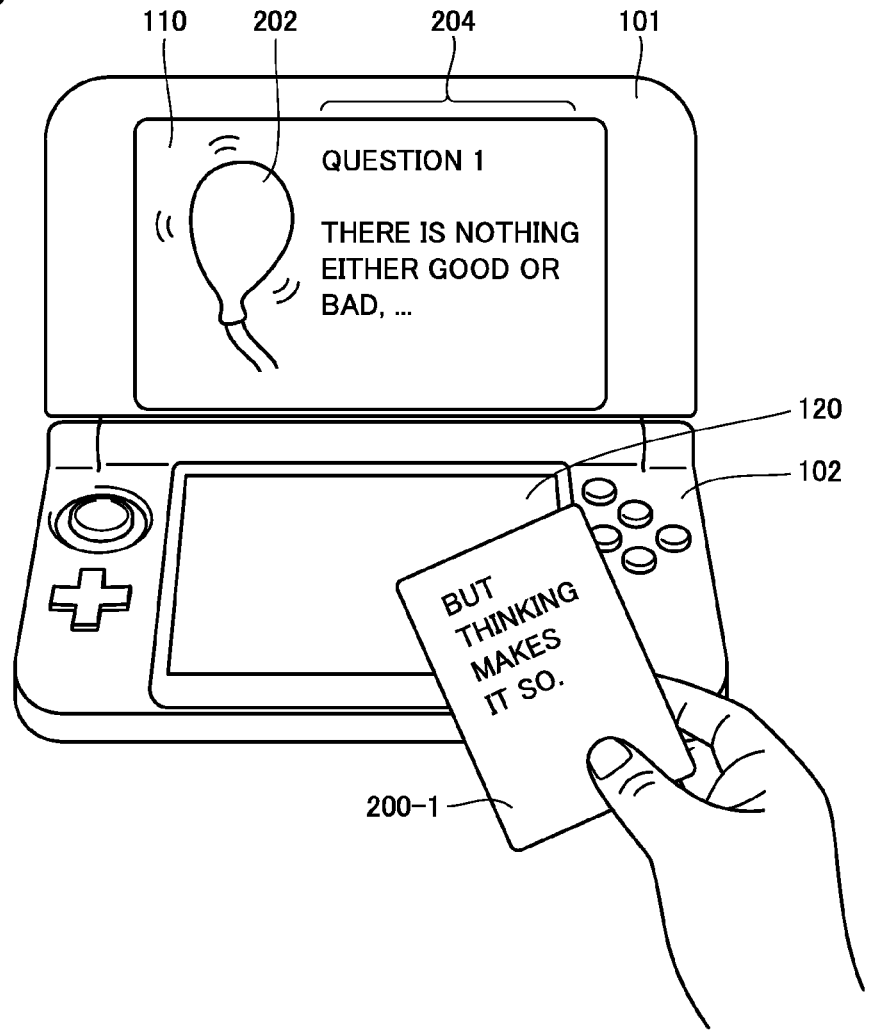
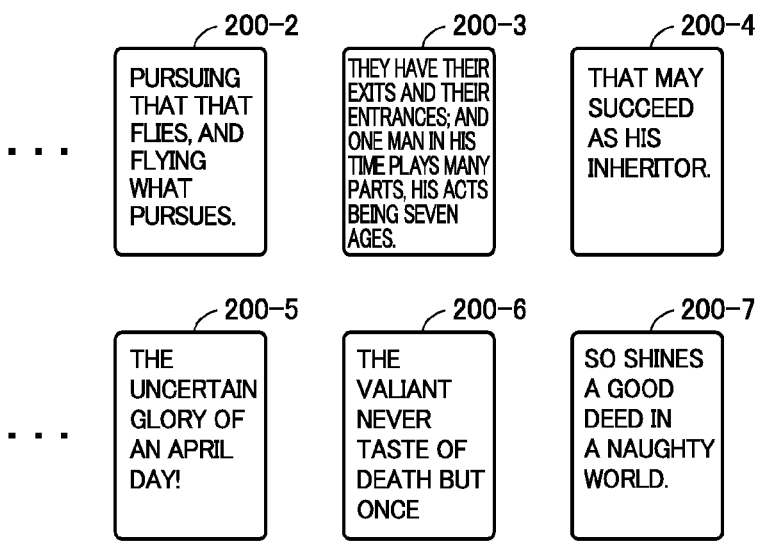

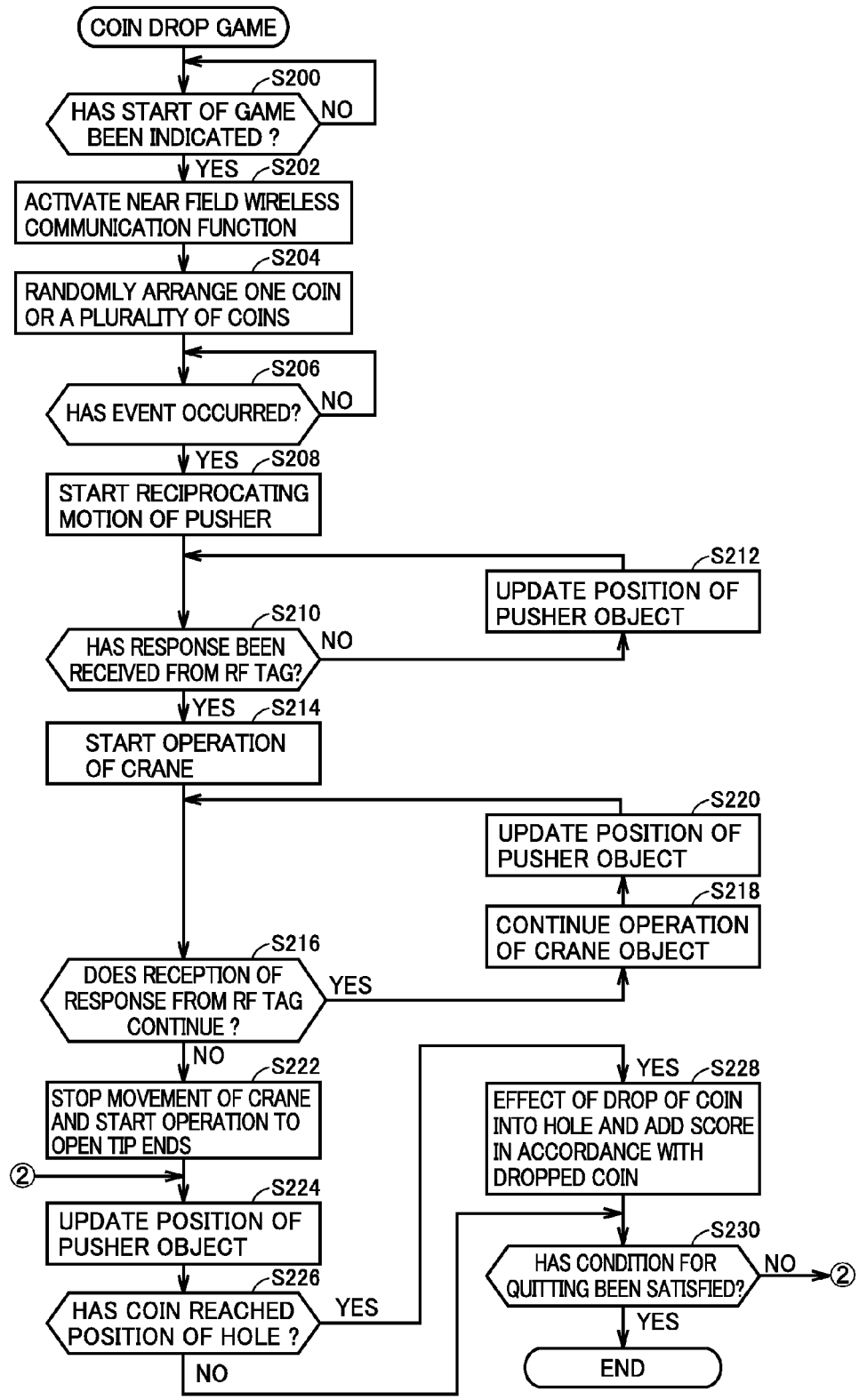

FIG.13
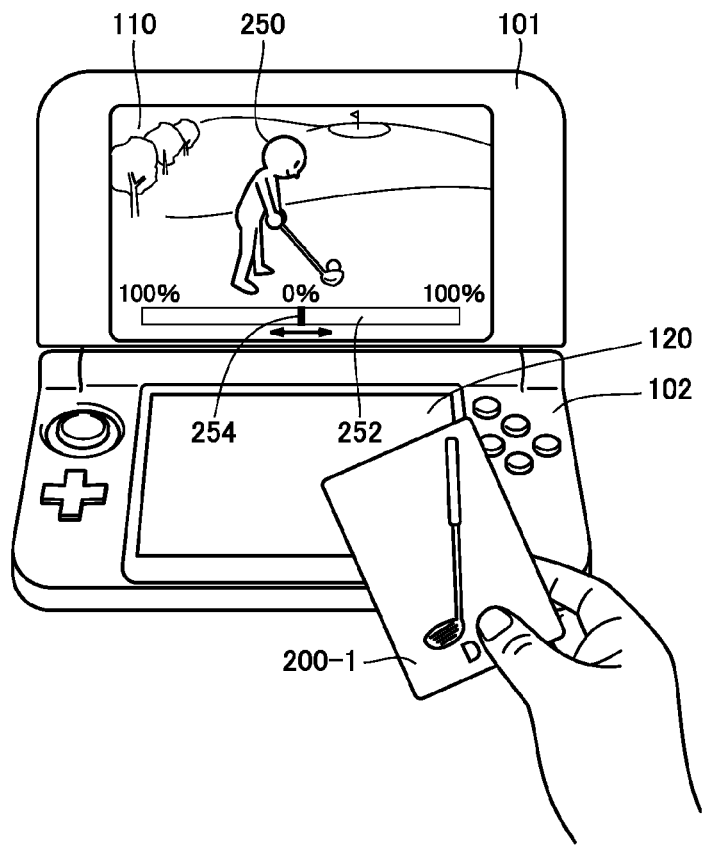
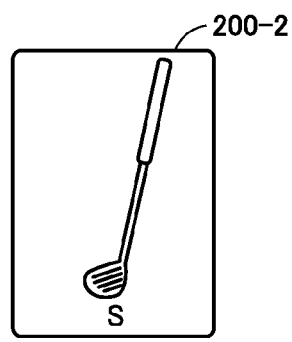
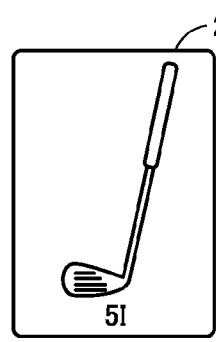
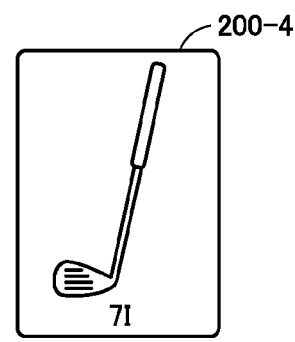
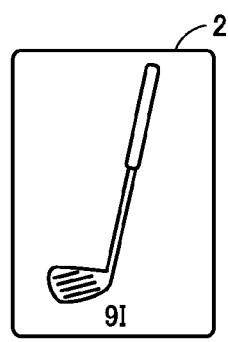
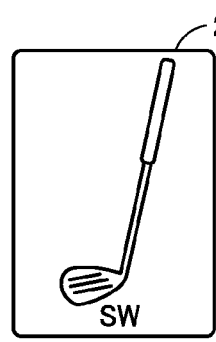
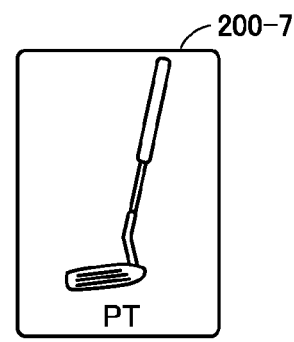

NON-TRANSITORY STORAGE MEDIUM
ENCODED WITH COMPUTER READABLE
INFORMATION PROCESSING PROGRAM,
INFORMATION PROCESSING APPARATUS,
INFORMATION PROCESSING SYSTEM,
AND INFORMATION PROCESSING
METHOD

This nonprovisional application is based on Japanese Patent Application No. 2015-030513 filed with the Japan Patent Office on Feb. 19, 2015, the entire contents of which are hereby incorporated by reference.

FIELD

The present technology relates to a non-transitory storage medium encoded with a computer readable information processing program making use of near field wireless communication, an information processing apparatus, an information processing system, and an information processing method.

BACKGROUND AND SUMMARY

Various applications making use of near field wireless communication have been put into practical use. In a general application, predetermined processing is performed with reading of some information from a radio frequency (RF) tag serving as a trigger.

In the conventional technique, reading of information from an information storage medium is used only as an instantaneous trigger. Therefore, a user experience to hold the information storage medium over a reader was limited to only a unique experience resulting from an action to "hold the information storage medium over." Namely, though a type of information read from the information storage medium is various, a result of the same type was merely obtained from the same type of information, without being dependent on timing.

An information processing program which brings about a new user experience which originates from an action by a user to hold an information storage medium over and/or an action to stop holding the information storage medium over has been demanded.

An exemplary embodiment provides a non-transitory storage medium encoded with a computer readable information processing program executed by a computer with a near field wireless communication function. The information processing program causes the computer to perform the following acts. The acts include exchanging data with an information storage medium through near field wireless communication with the information storage medium and performing predetermined processing in accordance with a time difference between predetermined timing and one of timing at which exchange of data with the information storage medium is enabled and timing at which exchange of data with the information storage medium is disabled.

The processing may include setting the timing at which exchange of data with the information storage medium is enabled as the predetermined timing and performing the predetermined processing in accordance with a time difference between the timing at which exchange of data with the information storage medium is disabled and the timing at which exchange of data with the information storage medium is enabled.

The processing may include increasing influence on the predetermined processing as the calculated time difference is greater.

The processing may include increasing or decreasing influence on the predetermined processing depending on the calculated time difference.

The processing may include varying a degree of influence on the predetermined processing depending on information included in the information storage medium.

The processing may include varying a degree of change with regard to an identical characteristic value among objects handled in the predetermined processing, depending on the information included in the information storage medium.

The processing may include varying a degree of change with regard to a distinct characteristic value among objects handled in the predetermined processing, depending on the information included in the information storage medium.

The predetermined timing may be set to timing after the timing at which exchange of data with the information storage medium is enabled.

The processing may include increasing influence on the predetermined processing as a time difference between the timing at which exchange of data with the information storage medium is disabled and the predetermined timing is smaller.

The processing may include varying a degree of influence on the predetermined processing depending on information included in the information storage medium.

The processing may include varying a degree of change with regard to an identical characteristic value among objects handled in the predetermined processing, depending on the information included in the information storage medium.

The processing may include varying a degree of change with regard to a distinct characteristic value among objects handled in the predetermined processing, depending on the information included in the information storage medium.

The information storage medium may be an RF tag.

The information processing program may be a game program.

An exemplary embodiment provides an information processing apparatus that includes a communication portion which exchanges data with an information storage medium through near field wireless communication with the information storage medium and a processing module which performs predetermined processing in accordance with a time difference between predetermined timing and one of timing at which exchange of data with the information storage medium is enabled and timing at which exchange of data with the information storage medium is disabled.

An exemplary embodiment provides an information processing system that includes a communication portion which exchanges data with an information storage medium through near field wireless communication with the information storage medium and a processing module. The processing module performs, by executing an information processing program stored in the storage medium, predetermined processing in accordance with a time difference between predetermined timing and one of timing at which exchange of data with the information storage medium is enabled and timing at which exchange of data with the information storage medium is disabled.

An exemplary embodiment provides an information processing method performed by a computer with a near field wireless communication function. The information processing method includes exchanging data with an information storage medium through near field wireless communication with the information storage medium and performing predetermined processing in accordance with a time difference between predetermined timing and one of timing at which exchange of data with the information storage medium is enabled and timing at which exchange of data with the information storage medium is disabled.

An exemplary embodiment provides a non-transitory storage medium encoded with a computer readable information processing program executed by a computer with a near field wireless communication function. The information processing program causes the computer to perform the following acts. The acts include exchanging data with an information storage medium through near field wireless communication with the information storage medium and performing predetermined processing in accordance with a duration in which a state that data can be exchanged with the information storage medium continues.

An exemplary embodiment provides an information processing apparatus that includes a communication portion which exchanges data with an information storage medium through near field wireless communication with the information storage medium and a processing module which performs predetermined processing in accordance with a duration in which a state that data can be exchanged with the information storage medium continues.

An exemplary embodiment provides an information processing system that includes a communication portion which exchanges data with an information storage medium through near field wireless communication with the information storage medium and a processing module, and the processing module performs, by executing an information processing program stored in the storage medium, predetermined processing in accordance with a duration in which a state that data can be exchanged with the information storage medium continues.

An exemplary embodiment provides an information processing method performed by a computer with a near field wireless communication function. The information processing method includes exchanging data with an information storage medium through near field wireless communication with the information storage medium and performing predetermined processing in accordance with a duration in which a state that data can be exchanged with the information storage medium continues.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 shows an exemplary illustrative non-limiting drawing illustrating a first application executed in the game device according to the present embodiment.

FIG. 6 shows an exemplary illustrative non-limiting drawing illustrating a flowchart showing a processing procedure in the second application executed in the game device according to the present embodiment.

FIG. 13 shows an exemplary illustrative non-limiting drawing illustrating a sixth application executed in the game device according to the present embodiment.

DETAILED DESCRIPTION OF NON-LIMITING EXAMPLE EMBODIMENTS

Figure 1:
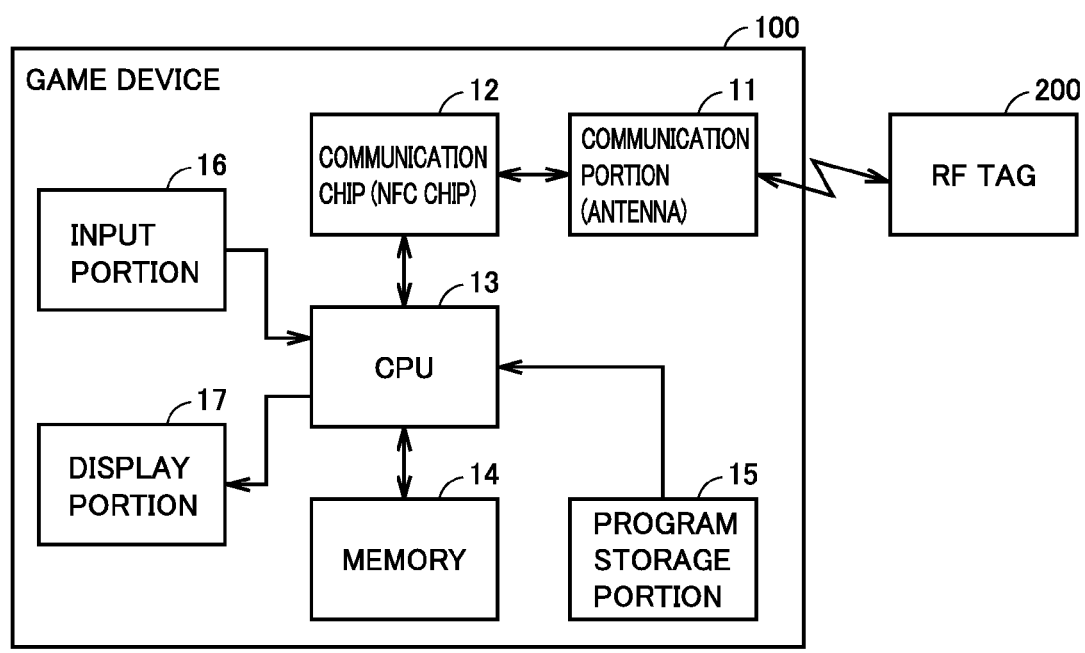
FIG. 1 shows an exemplary illustrative non-limiting drawing illustrating a configuration example of a game device according to the present embodiment.

The present embodiment will be described in detail with reference to the drawings. The same or corresponding elements in the drawings have the same reference characters allotted and description thereof will not be repeated. A game device 100 by way of example of an information processing apparatus according to the present embodiment will be exemplified.

[A. Game Device 100]

Referring to FIG. 1, game device 100 is any computer which can establish near field wireless communication with an RF tag 200 representing an information storage medium.

In the present embodiment, communication in compliance with NFC specifications between game device 100 and RF tag 200 will be described by way of example of near field wireless communication. Here, near field wireless communication refers, by way of example, to a communication scheme in which radio waves (for example, electromagnetic induction) from one apparatus generate electromotive force in the other apparatus. The other apparatus can operate with generated electromotive force (the other apparatus may or may not have a power supply).

In near field wireless communication, communication can be established when game device 100 and RF tag 200 are proximate to each other (typically, a distance therebetween is not greater than ten and several centimeters). In near field wireless communication, sending of radio waves continues while communication between two communication apparatuses is maintained (while another tag is proximate to a communication apparatus). Though a scheme of communication through radio waves is described by way of example, limitation thereto is not particularly intended. Optical communication or communication via other media may be applicable and a scheme is not limited.

Game device 100 is any information processing apparatus which can establish near field wireless communication. In the present embodiment, game device 100 may be, for example, a portable (also referred to as mobile) device such as a portable game device, a portable telephone, or a smartphone, a stationary device such as a personal computer or a home game console, or a large apparatus such as an arcade game machine. For example, game device 100 may be a portable device having an NFC reader and writer function.

RF tag 200 is any device which can establish near field wireless communication with game device 100. In the present embodiment, RF tag 200 is an information storage medium having a function as an NFC tag. Namely, the tag includes a circuit (an IC chip) establishing near field wireless communication and storage means for storing data (such as a memory). Namely, the tag is a radio frequency identification (RFID) including a circuit which can read from and write into storage means. RF tag 200 may be a device having only a function to store data (an RF tag), or may be, for example, an information processing apparatus (a portable device) having an NFC card emulation function.

A configuration of game device 100 will be described below. As shown in FIG. 1, game device 100 includes a communication portion 11. Communication portion 11 is implemented by an antenna used for near field wireless communication. Game device 100 includes a communication chip 12. Communication chip 12 generates data (radio waves/a signal) to be sent from communication portion 11 in response to an instruction from a CPU 13 which will be described later. The generated data is sent from communication portion 11. Communication chip 12 is implemented, for example, by an NFC chip. As CPU 13 executes an information processing program, communication portion 11 and communication chip 12 function as communication means for exchanging data with an information storage medium through near field wireless communication with the information storage medium.

As shown in FIG. 1, game device 100 includes CPU 13 and a memory 14. CPU 13 is an information processing portion for performing various types of information processing performed in game device 100. CPU 13 performs the various types of information processing with the use of memory 14.

Game device 100 includes a program storage portion 15. Program storage portion 15 stores various programs (including a communication program and an application program which will be described later) executed in game device 100. Program storage portion 15 is any storage device (storage medium) which can be accessed by CPU 13. Program storage portion 15 may be implemented, for example, by a storage portion contained in game device 100 such as a hard disk or a memory, a storage medium which can be attached to or removed from game device 100 such as an optical disc or a cartridge, or both of the storage portion and the storage medium. In such a case, a game system representing one example of an information processing system including game device 100 and any storage medium may be configured.

In the present embodiment, in game device 100, at least two types of programs of an application program and a communication program are stored in program storage portion 15. An application program is a program for executing any application communicating data with RF tag 2. The application program may be, for example, a game program performing predetermined processing using game data by reading the game data from RF tag 2. The communication program is a program for establishing near field wireless communication with RF tag 2. For example, the communication program is firmware for operating communication chip 12, and may be prepared in advance in game device 100 as a library. The communication program has communication chip 12 perform an operation for communication in response to a command from an application. When a plurality of application programs can be executed in game device 100, the communication program is commonly used among applications. An application program and a communication program may be mounted as an information processing program. The information processing program can also be applied to another application.

Game device 100 includes an input portion 16 accepting an instruction from a user, such as a button or a touch panel. Game device 100 includes a display portion 17 displaying an image generated through information processing.

Game device 100 may be implemented by a plurality of apparatuses. For example, game device 100 may be configured in such a manner that an apparatus including communication portion 11 and communication chip 12 is removably connected to an apparatus including CPU 13 and memory 14. Game device 100 may be implemented by a main body apparatus having CPU 13 and an apparatus having input portion 16 and/or display portion 17 which are separate from each other. For example, in another embodiment, game device 100 may be implemented by a main body apparatus and a terminal apparatus having input portion 16 and display portion 17, or by a main body apparatus and an operation apparatus having input portion 16. Game device 100 may employ a television as a display apparatus, without including display portion 17.

In another embodiment, at least a part of information processing performed in game device 100 may be performed as distributed among a plurality of apparatuses capable of communicating over a network (a wide area network and/or a local network).

[B. Overview]

A method of providing a new user experience originating from an action by a user to hold RF tag 200 over with the use of game device 100 according to the present embodiment will now generally be described.

At any timing, a user can hold RF tag 200 over game device 100 according to the present embodiment and can stop holding RF tag 200 over game device 100 (that is, move RF tag 200 away from game device 100). Skills or strategies in at which timing such an operation to hold RF tag 200 over and an operation to stop holding RF tag 200 over (that is, move RF tag 200 away from game device 100) should be performed can be enjoyed.

For example, a game in which how early an operation to hold RF tag 200 over and/or an operation to stop holding RF tag 200 over is performed with respect to a certain reference timing is competed for can be provided. Alternatively, a game in which influence or specifying is differed depending on a length of a period from a certain reference timing until timing of an operation to hold RF tag 200 over and/or an operation to stop holding RF tag 200 over can be provided. Alternatively, a game in which influence or specifying is differed depending on a length of a period from an operation to hold RF tag 200 over until an operation to stop holding RF tag 200 over can be provided.

Figure 2:
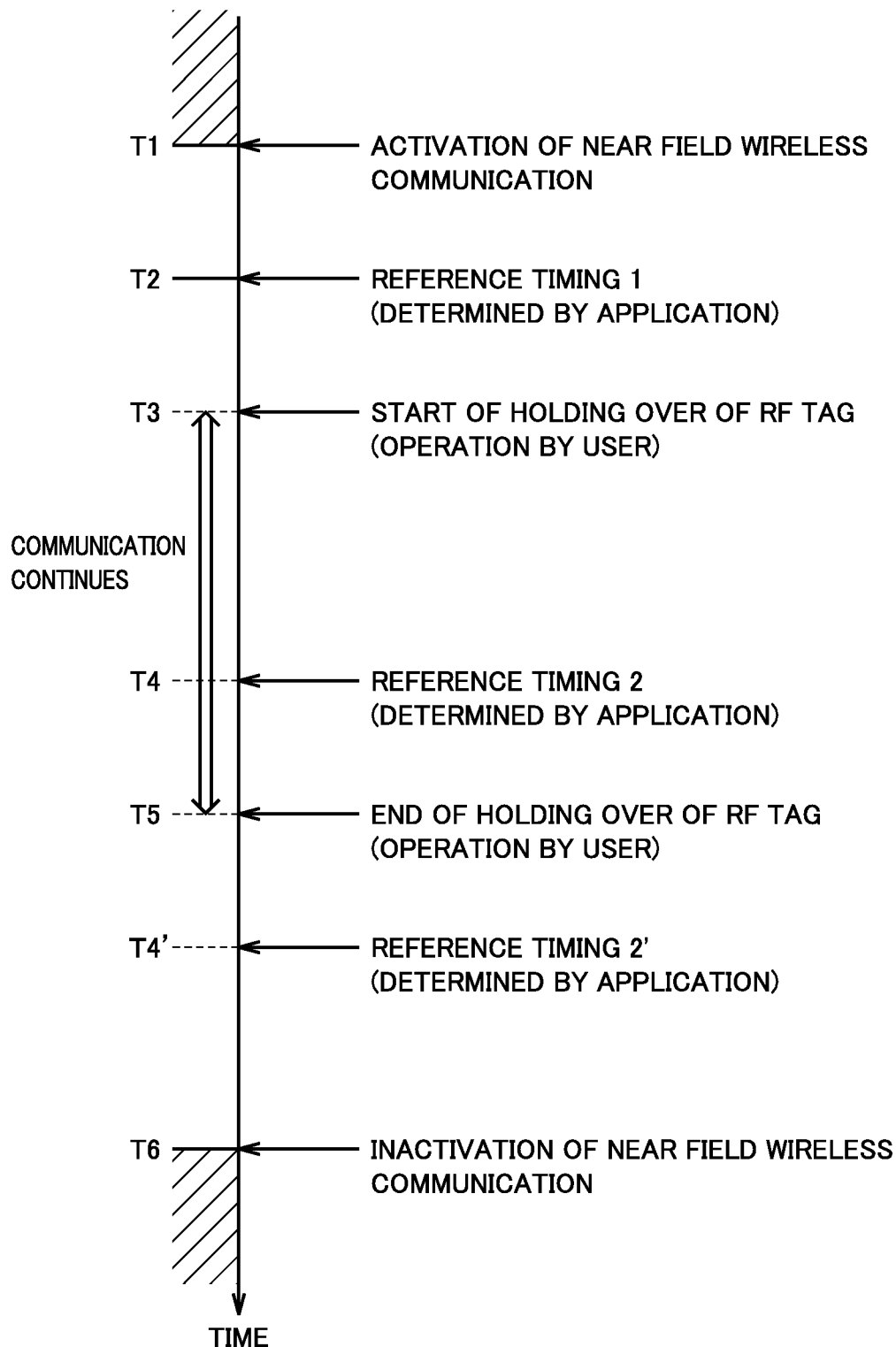
FIG. 2 shows an exemplary illustrative non-limiting drawing illustrating a new user experience provided by the game device according to the present embodiment.

In connection with an operation by the user to hold RF tag 200 over and/or to stop holding RF tag 200 over, timing as shown in FIG. 2 can be assumed. Depending on an application, all of timings T1, T2, T3, T4, T4', T5, and T6 shown in FIG. 2 are not defined.

Timing T1 and timing T6 indicate start and end of a period during which data (radio waves/a signal) can be exchanged with (read from/written in) RF tag 200, respectively. Namely, the near field wireless communication function is activated at timing T1 and the near field wireless communication function is inactivated at timing T6. Timings T1 and T6 are basically determined by an application. Alternatively, timings T1 and T6 are determined by a switch dependent on an operating system or hardware different from an application. The user may be notified of the fact that use of RF tag 200 is allowed in synchronization with the timing at which exchange (reading/writing) of data (radio waves/a signal) is enabled, or timing of enablement and the timing to notify the user of the fact that use of RF tag 200 is allowed may be deviated from each other.

Timings T2, T4, and T4' serve as the reference of a period (a time difference) defined with respect to an operation by a user to hold RF tag 200 over and/or to stop holding RF tag 200 over. Timings T2, T4, and T4' are basically determined by an application. Namely, timings T2, T4, and T4' are determined as appropriate in accordance with progress of a game by means of an application.

Timing T3 corresponds to timing at which the user starts to hold RF tag 200 over, and timing T5 corresponds to timing at which the user finishes holding RF tag 200 over. Namely, timings T3 and T5 are determined depending on an operation by the user. In game device 100 according to the present embodiment, game processing proceeds in accordance with a length of a period (that is, a time difference) for which at least one of timing T3 and timing T5 determined depending on an operation by the user marks the start or the end.

A period from timing T3 to timing T5 means a period during which data can be exchanged with RF tag 200 (a duration of communication), and basically corresponds to a period during which the user continues to hold RF tag 200 over. Namely, a period from timing T3 to timing T5 corresponds to a duration in which data can be exchanged with RF tag 200.

During the period from timing T3 to timing T5, game device 100 repeats pulse emission in a prescribed cycle, and in each cycle, whether or not data is successfully exchanged with RF tag 200 is determined based on whether or not some information is returned from RF tag 200. Game device 100 determines that communication has been disconnected when response is no longer obtained from RF tag 200.

In game device 100 according to the present embodiment, in a typical application, game processing proceeds in accordance with a time difference between predetermined timing (timings T1, T2, T3, T4, T4', and T6) and one of the timing (timing T3) at which exchange of data with RF tag 200 is enabled and the timing (timing T5) at which exchange of data with RF tag 200 is disabled.

In game device 100 according to the present embodiment, in another typical application, game processing proceeds in accordance with a duration (timing T3 to T5) in which data can be exchanged with RF tag 200.

Some applications implementing the novel concept as described above will be described below.

[C. Application]

<c1: Application 1>

Game processing performed in accordance with a time difference between the timing (timing T3) at which exchange of data with RF tag 200 is enabled and predetermined timing (timing T1 or timing T2) will initially be described as a first application.

The first application shown in FIG. 3 is a phrase matching game. In a basic method of playing, when a "first-half phrase" is displayed on an upper display module 110 of an upper housing 101, the user holds RF tag 200, on which a corresponding "latter-half phrase" is printed, over a lower display module 120 of a lower housing 102. How short a period from the timing of start of representation of a "first-half phrase" until reading of a content in RF tag 200 held over by the user, on which a corresponding "latter-half phrase" is printed, is competed for.

By way of example, only a "latter-half phrase" of a famous Shakespeare's line is printed on a surface of card-type RF tag 200. The user arranges these RF tags 200-1, 200-2, . . . , and 200-N before game device 100 as preparation. Each RF tag 200 stores identification information for uniquely specifying a "latter-half phrase" printed on the surface thereof. When any RF tag 200 is held over, game device 100 reads the identification information from held RF tag 200, and determines which RF tag 200 having a "latter-half phrase" printed has been held over.

In response to an event determined on an application side, representation of an object 204 indicating a randomly selected "first-half phrase" is started on upper display module 110. As a manner of representation of object 204, a character string included in the "first-half phrase" may be displayed at once, or characters included in the character string may successively be displayed one by one.

When representation of object 204 is started, an object 202 representing a balloon starts to be inflated. After the start of representation of object 204, object 202 continues to be inflated until corresponding RF tag 200 is appropriately held over. Finally, when a period until corresponding RF tag 200 is held over after the start of representation of object 204 exceeds a predetermined upper limit value, the time expires and such an effect that balloon object 202 is broken is provided.

Typically, a plurality of cards may successively be displayed without resetting inflation of object 202 and how many phrases could be matched by the time the balloon is broken can be competed for. When one player plays, the user will play so as to increase the total number of matches, and when a plurality of players play, the users will compete for the total number of matches.

Alternatively, as the period until corresponding RF tag 200 is held over is shorter after the start of representation of object 204, a higher score may be added, or the total score accumulated in a prescribed number of plays may be competed for.

Further alternatively, when a plurality of game devices 100 are connected to one another through wireless communication and a plurality of users can simultaneously play, which user has held corresponding RF tag 200 over his/her own game device 100 earliest (a time period until correct RF tag 200 is held over) can also be competed for.

In the first application shown in FIG. 3, predetermined timing defined as the reference for calculation of a time difference is either timing T1 or timing T2 shown in FIG. 2. Then, a time difference between this predetermined timing T1 or T2 and timing T3 at which the user started to hold corresponding RF tag 200 over, that is, the timing at which exchange of data with RF tag 200 is enabled, is defined. Thus, in the first application shown in FIG. 3, game processing proceeds in accordance with a time difference between timing T1 and timing T3 or a time difference between timing T2 and timing T3. In the first application shown in FIG. 3, timing T1 and timing T2 do not necessarily have to be distinguished from each other, and timing T1 and timing T2 may be the same timing. Namely, the near field wireless communication function may be activated at timing at which representation of object 204 representing a "first-half phrase" is started.

Figure 4:
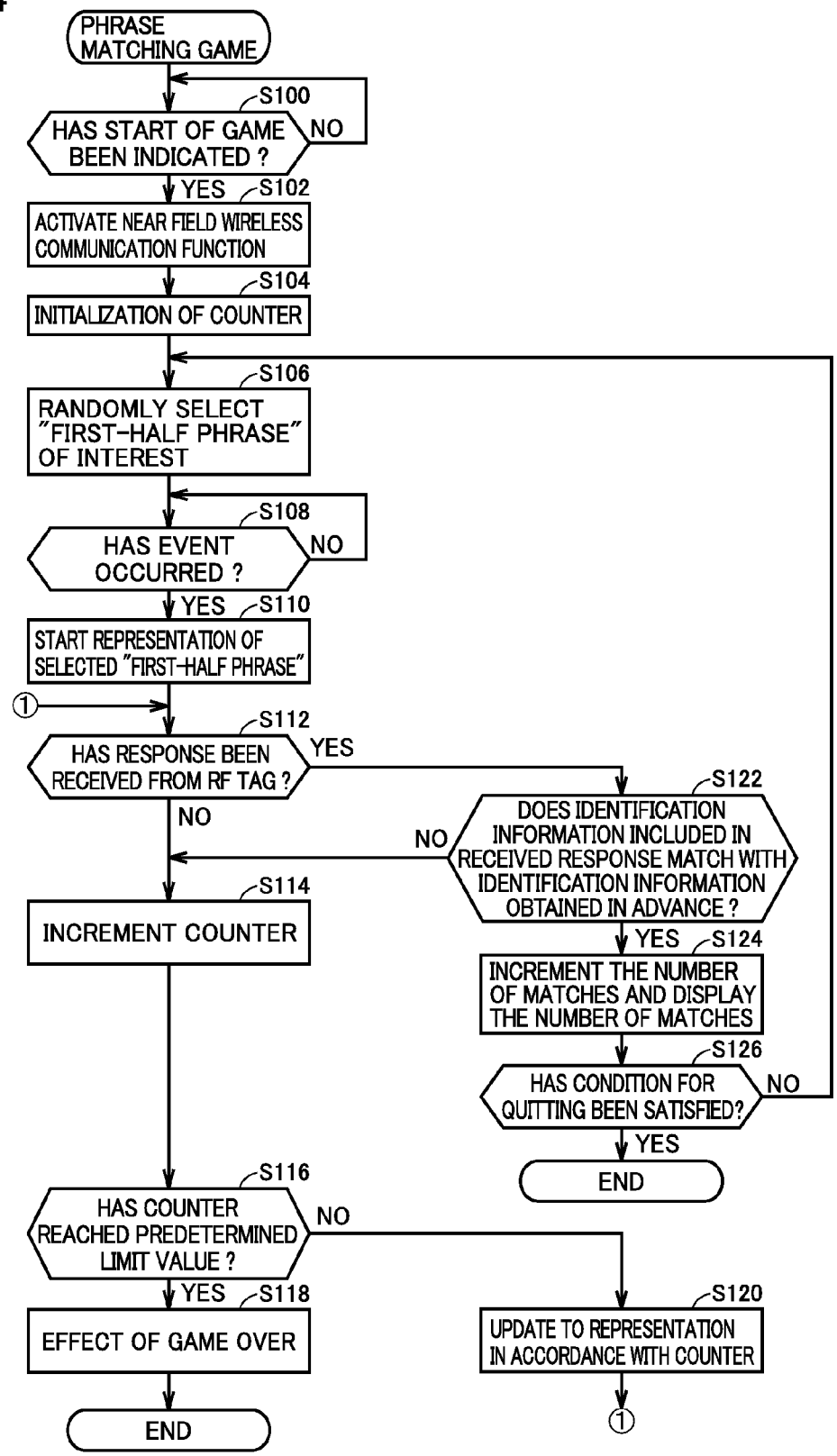
FIG. 4 shows an exemplary illustrative non-limiting drawing illustrating a flowchart showing a processing procedure in the first application executed in the game device according to the present embodiment.

Each step shown in FIG. 4 is implemented as CPU 13 executes an information processing program.

Referring to FIG. 4, when start of the game has been indicated (YES in step S100), CPU 13 of game device 100 initially activates the near field wireless communication function (step S102). Thereafter, communication portion 11 (FIG. 1) arranged at a position in lower display module 120 continues to periodically emit pulses. Thus, game device 100 exchanges data with any proximate RF tag. Then, CPU 13 initializes a counter associated with object 202 (FIG. 3) representing a balloon (step S104) and randomly selects a "first-half phrase" of interest from "first-half phrases" for the phrase matching game stored in advance (step S106). Typically, game device 100 has a database in which image data for presenting object 204 (FIG. 3) representing a "first-half phrase" and identification information (stored in RF tag 200) representing a corresponding "latter-half phrase" are associated with each other. By referring to such a database, CPU 13 obtains also identification information indicating a "latter-half phrase" corresponding to a selected "first-half phrase." When start of the game has not been indicated (NO in step S100), processing in step S100 is repeated.

Then, in response to an event issued from a real time clock serving as a time counting function (YES in step S108), CPU 13 starts representation of the selected "first-half phrase" on upper display module 110 (step S110). In succession, CPU 13 determines whether or not response has been received from any RF tag 200 (step S112). When an event issued from the real time clock serving as the time counting function has not been received (NO in step S108), processing in step S108 is repeated.

When response has not been received from any RF tag 200 (NO in step S112), CPU 13 increments the counter (step S114). Then, CPU 13 determines whether or not the incremented counter has reached a predetermined limit value (step S116).

When the incremented counter has reached the predetermined limit value (YES in step S116), it means that the game is over, and CPU 13 provides an effect that the game is over (step S118) and game processing of the phrase matching game ends. In contrast, when the incremented counter has not reached the predetermined limit value (NO in step S116), CPU 13 updates object 202 representing the balloon to representation in accordance with a value of the incremented counter (step S120). Then, processing in step S112 or later is repeated.

Namely, in the processing in step S112 or later, in game device 100, game processing proceeds in accordance with a time difference between the timing (timing T3) at which exchange of data with RF tag 200 is enabled and the predetermined timing (timing T1 or T2).

In contrast, when some response has been received from any RF tag 200 (YES in step S112), CPU 13 determines whether or not identification information included in the received response and identification information obtained in advance in step S106 match with each other (step S122).

When the identification information included in the received response and the identification information obtained in advance do not match with each other (NO in step S122), processing in steps S114 to S120 is performed. In contrast, when the identification information included in the received response and the identification information obtained in advance match with each other (YES in step S122), it means that RF tag 200 on which the "latter-half phrase" corresponding to the displayed "first-half phrase" is printed was appropriately held over, and CPU 13 increments the number of matches and has upper display module 110 display the number of matches (step S124).

Thereafter, CPU 13 determines whether or not a condition for quitting the game processing has been satisfied (step S126). A condition for quitting this game processing may be an explicit or implicit instruction from the user, the number of matches reaching a predetermined value, or a duration of the game processing reaching a predetermined value.

When a condition for quitting the game processing has not been satisfied (NO in step S126), processing in step S106 or later is repeated. In contrast, when the condition for quitting the game processing has been satisfied (YES in step S126), the game processing of the phrase matching game ends.

Through a processing procedure as above, the game processing in accordance with a time difference between the timing (timing T3) at which exchange of data with RF tag 200 is enabled and the predetermined timing (timing T1 or timing T2) is performed. Namely, in the first application, whether or not the game should be over is determined based on an accumulated value of time differences.

In the first application, a new user experience originating from a user action to hold an RF tag over, in which skills in how early response to visually obtained information is given are competed for, can be provided.

<c2: Application 2>

Game processing performed in accordance with a time difference between the timing (timing T3) at which exchange of data with RF tag 200 is enabled and the predetermined timing (timing T1 or timing T2) and a time difference between the timing (timing T5) at which exchange of data with RF tag 200 is disabled and the timing (timing T3) at which exchange of data with RF tag 200 is enabled will now be described as a second application.

Figure 5A:
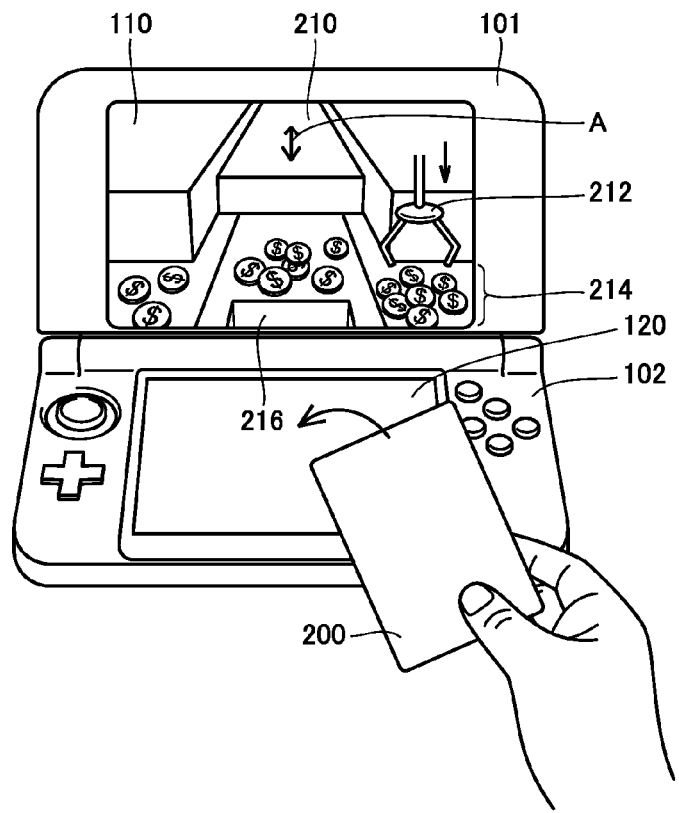
FIGS. 5A and 5B show exemplary illustrative non-limiting drawings each illustrating a second application executed in the game device according to the present embodiment.
Figure 5B:
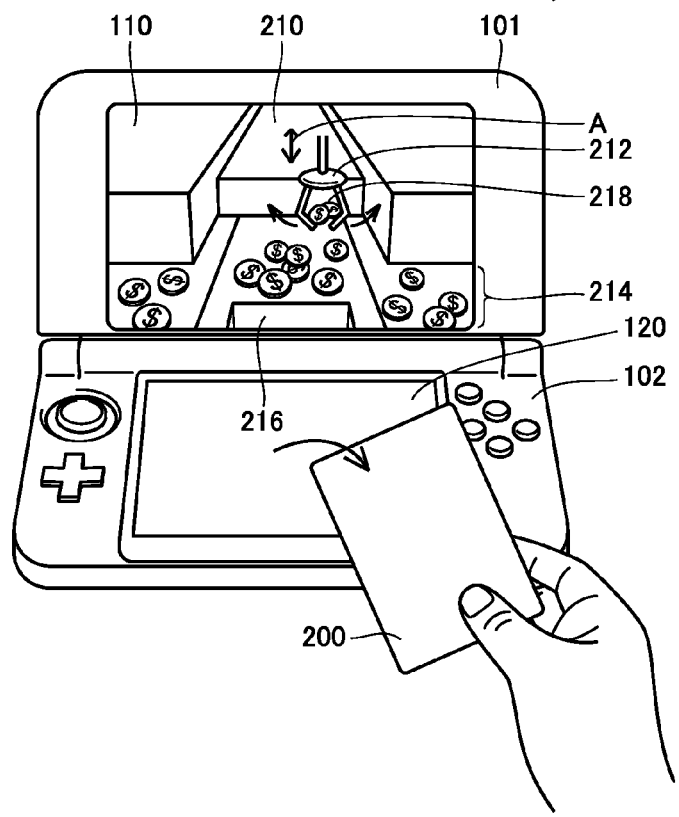

The second application shown in FIGS. 5A and 5B is a coin drop game. In a basic method of playing, in upper display module 110 of upper housing 101, a pusher object 210 which starts reciprocating motion in a direction shown with A in the drawing in response to some trigger is arranged, and a hole object 216 for acquiring coins is provided in a path of reciprocating motion of object 210. A crane object 212 controlled by an operation by the user to hold RF tag 200 over/move RF tag 200 away as will be described later is used to arrange a coin object 214 on the path of object 210 so that object 214 is pushed by object 210. When object 214 reaches a position of object 216, coins can be acquired. The number of acquired coins is competed for.

More specifically, reciprocating motion of object 210 is started in response to an event determined on an application side. As reciprocating motion of object 210 is started, an operation of object 212 is enabled. In this state, the user holds RF tag 200 over lower display module 120 of lower housing 102 at any timing. Then, object 212 starts an operation to catch coins and move the coins toward the path of object 210 (see FIG. 5A). This operation of object 212 continues while the user holds RF tag 200 over.

Thereafter, the user stops holding RF tag 200 over lower display module 120 of lower housing 102 (that is, moves RF tag 200 away from game device 100) at timing which seems to be suitable. Then, object 212 stops moving and opens tip ends thereof so as to drop a caught coin object 218. Dropped object 218 is pushed forward when viewed from the user as a result of reciprocating motion of object 210.

In the second application shown in FIGS. 5A and 5B, two types of time differences are used.

Prescribed timing defined as the reference for calculation of a first time difference (a period until crane object 212 starts an operation) is either timing T1 or timing T2 shown in FIG. 2. Then, a time difference between this predetermined timing T1 or T2 and timing T3 at which the user started to hold corresponding RF tag 200 over, that is, the timing at which exchange of data with RF tag 200 is enabled, is defined. Thus, in the second application shown in FIGS. 5A and 5B, game processing proceeds in accordance with the time difference between timing T1 and timing T3 or the time difference between timing T2 and timing T3. In the second application shown in FIGS. 5A and 5B, timing T1 and timing T2 do not necessarily have to be distinguished from each other, and timing T1 and timing T2 may be the same timing. Namely, the near field wireless communication function may be activated at timing at which pusher object 210 starts reciprocating motion.

Prescribed timing defined as the reference for calculation of a second time difference (a duration of an operation of crane object 212) is timing T3 shown in FIG. 2. A time difference between this predetermined timing T3 and timing T5 at which the user finished holding corresponding RF tag 200 over, that is, the timing at which exchange of data with RF tag 200 is disabled, is defined. Thus, in the second application shown in FIGS. 5A and 5B, game processing proceeds in accordance with the time difference between timing T3 and timing T5. In other words, the game processing proceeds in accordance with a duration of a state that data can be exchanged with RF tag 200 (timing T3 to timing T5).

Each step shown in FIG. 6 is implemented as CPU 13 (FIG. 1) executes an information processing program.

Referring to FIG. 6, when start of the game has been indicated (YES in step S200), CPU 13 of game device 100 initially activates the near field wireless communication function (step S202). Thereafter, communication portion 11 (FIG. 1) arranged at a position in lower display module 120 continues to periodically emit pulses. Thus, game device 100 exchanges data with any proximate RF tag. Then, CPU 13 randomly arranges one object 214 or a plurality of objects 214 representing coin(s) (step S204). When start of the game has not been indicated (NO in step S200), processing in step S200 is repeated.

Then, in response to an event issued from the real time clock serving as the time counting function (YES in step S206), CPU 13 starts reciprocating motion of pusher object 210 (step S208). In succession, CPU 13 determines whether or not response has been received from RF tag 200 (step S210). When an event issued from the real time clock serving as the time counting function has not been received (NO in step S206), processing in step S206 is repeated.

When no response has been received from RF tag 200 (NO in step S210), CPU 13 updates a position of pusher object 210 (step S212). Then, processing in step S210 or later is repeated.

In contrast, when response has been received from RF tag 200 (YES in step S210), CPU 13 starts an operation of crane object 212 (step S214). Then, CPU 13 determines whether or not reception of response from RF tag 200 continues (step S216).

When reception of response from RF tag 200 continues (YES in step S216), CPU 13 continues an operation of crane object 212 (step S218) and updates a position of pusher object 210 (step S220). Then, processing in step S216 or later is repeated.

In contrast, when reception of response from RF tag 200 does not continue (NO in step S216), that is, when response from RF tag 200 can no longer be received, CPU 13 stops movement of crane object 212 and starts an operation to open its tip ends (step S222). In addition, such representation and processing that coins caught by the crane are dropped and arranged at corresponding positions are performed. Furthermore, CPU 13 updates a position of pusher object 210 (step S224). In addition, positions of arranged coins are updated based on a result of determination of contact between the pusher and the arranged coins. When coins of which positions have been moved reach a position of hole object 216 (YES in step S226), an effect that coins drop into the hole is provided and scores in accordance with the dropped coins are added (step S228). When coins of which positions have been moved do not reach the position of hole object 216 (NO in step S226), processing in step S228 is skipped.

Thereafter, CPU 13 determines whether or not a condition for quitting the game processing has been satisfied (step S230). A condition for quitting this game processing may be an explicit or implicit instruction from the user, the acquired scores reaching a predetermined value, or a duration of the game processing reaching a predetermined value.

When a condition for quitting the game processing has not been satisfied (NO in step S230), processing in step S224 or later is repeated. In contrast, when the condition for quitting the game processing has been satisfied (YES in step S230), the game processing of the coin drop game ends.

Through a processing procedure as above, the game processing in accordance with the time difference between the timing (timing T3) at which exchange of data with RF tag 200 is enabled and the predetermined timing (timing T1 or timing T2) is performed. Namely, in the second application, relative relation between the pusher and the crane is varied in accordance with the time difference.

The game processing in accordance with the time difference between the timing (timing T5) at which exchange of data with RF tag 200 is disabled and the timing (timing T3) at which exchange of data with RF tag 200 is enabled is performed. In other words, the game processing in accordance with a duration of a state that data can be exchanged with RF tag 200 is performed. Namely, in the second application, relative relation between the pusher and the crane (or coins dropped from the crane) is varied in accordance with the time difference.

The second application is directed to game processing in which a higher score is obtained by maintaining objects in appropriate relative relation, and the user strategically determines such relative relation between the objects based on his/her action to hold RF tag 200 over/move RF tag 200 away. Therefore, skills (techniques) in an action to hold RF tag 200 over/move RF tag 200 away are competed for, and a new user experience can be provided.

<c3: Application 3>

Similarly to the second application described above, game processing performed in accordance with a time difference between the timing (timing T3) at which exchange of data with RF tag 200 is enabled and the predetermined timing (timing T1 or timing T2) and a time difference between the timing (timing T5) at which exchange of data with RF tag 200 is disabled and the timing (timing T3) at which exchange of data with RF tag 200 is enabled will be described as a third application.

Figure 7A:
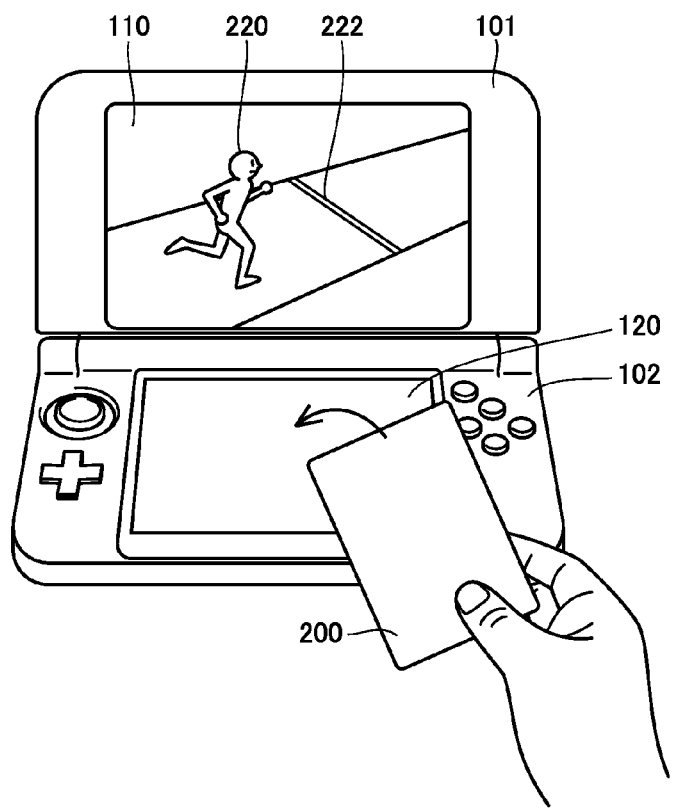
FIGS. 7A and 7B show exemplary illustrative non-limiting drawings each illustrating a third application executed in the game device according to the present embodiment.
Figure 7B:
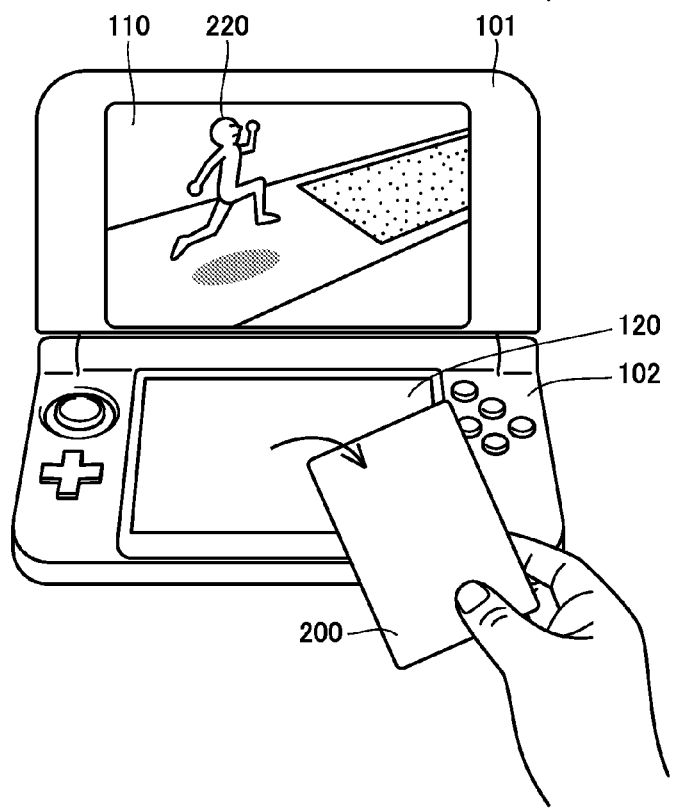

The third application shown in FIGS. 7A and 7B is a triple jump game. In a basic method of playing, a field for triple jump is displayed on upper display module 110 of upper housing 101, and a character 220 makes three vaults of hop, step, and jump. Character 220 starts running along the field in response to some trigger. When character 220 reaches a spring board object 222 or immediately before the same, the user holds RF tag 200 over game device 100 (see FIG. 7A). Then, character 220 starts the first and second vaults (hop and step). Namely, the first and second vaults of character 220 are started at the timing (timing T3) at which exchange of data with RF tag 200 is enabled. The first and second vaults by this character 220 are continuously performed for a period during which the user continues to hold RF tag 200 over (a duration of a state that data can be exchanged with RF tag 200).

Expecting the timing of end of the first and second vaults, the user stops holding RF tag 200 over (that is, moves RF tag 200 away from game device 100). Then, character 220 starts the third vault (jump) (see FIG. 7B). Namely, the third vault of character 220 is started at the timing (timing T5) at which exchange of data with RF tag 200 is disabled.

In the third application, timing of start and end of the first and second vaults (hop and step) (and a period therebetween) as well as timing of start and end of the third vault (jump) (and a period therebetween) should appropriately be adjusted, and a distance of vault of character 220 is determined depending on a time difference (deviation from an optimal value) between the timing (timing T1 or timing T2) of start of running of character 220 and timing T3 of start of holding RF tag 200 over and a time difference between timing T3 of start of holding RF tag 200 over and timing T5 of stop of holding RF tag 200 over. As each time difference is closer to the optimal value, a distance of vault of character 220 increases. Namely, game processing in accordance with a time difference between the timing (timing T3) at which exchange of data with RF tag 200 is enabled and the predetermined timing (timing T1 or timing T2) is performed.

Since a processing procedure in the third application is similar to the processing procedure (FIG. 6) in the second application described above, detailed description will not be repeated.

In the third application, an optimal value for a time difference from the predetermined timing (reference timing of an operation) is implicitly determined, and the user takes an action to hold RF tag 200 over/move RF tag 200 away such that each time difference is closer to this optimal value. Therefore, skills (techniques) in an action to hold RF tag 200 over/move RF tag 200 away are competed for, and a new user experience can be provided.

<c4: Application 4>

Game processing performed in accordance with a time difference between the timing (timing T5) at which exchange of data with RF tag 200 is disabled and the timing (timing T3) at which exchange of data with RF tag 200 is enabled will now be described as a fourth application.

Figure 8A:
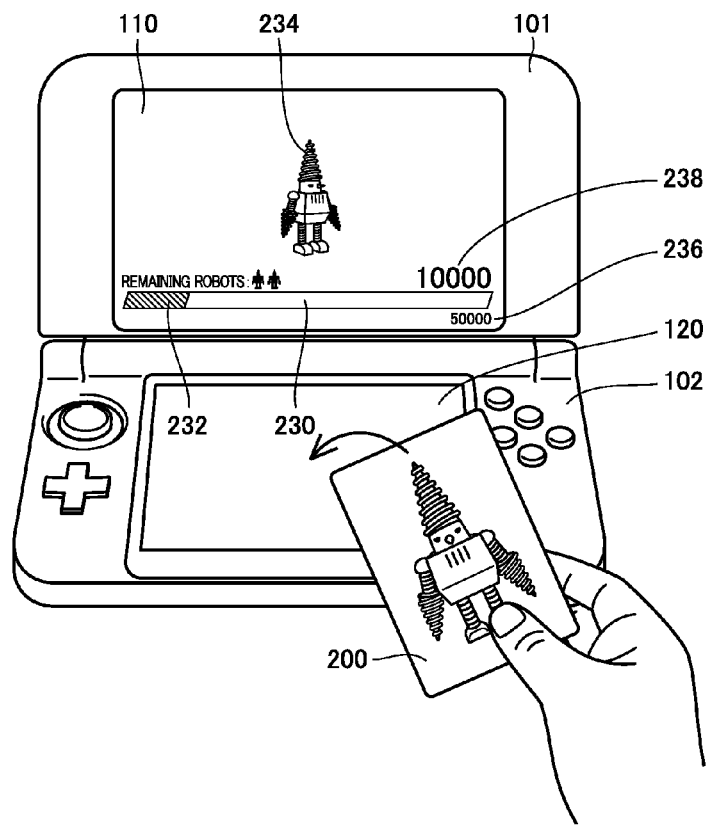
FIGS. 8A and 8B show exemplary illustrative non-limiting drawings each illustrating a fourth application executed in the game device according to the present embodiment.
Figure 8B:
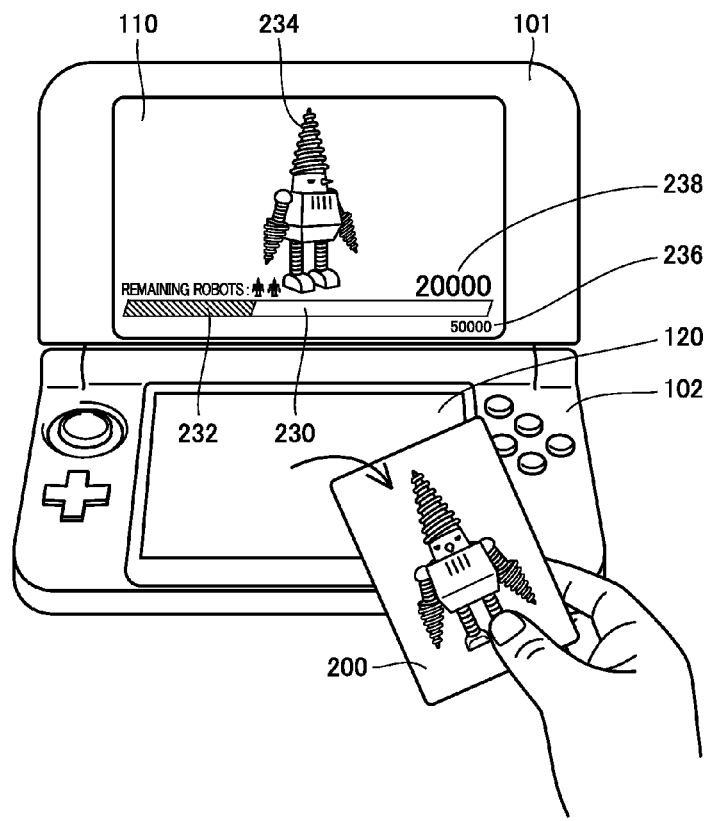

A fourth application shown in FIGS. 8A and 8B is an action game. In a basic method of playing, game processing proceeds with play by a single player or by a plurality of players, and a prescribed amount of energy (an object 236 representing a numeric value for total energy) is allocated in advance to each user. A plurality of robots can be generated within limits of this prescribed amount of energy. One type of robot or a plurality of types of robots may be generated. Under rules for generating a plurality of types of robots, for example, a plurality of RF tags 200 on each of which a robot is printed are prepared and a user may be able to strategically select a plurality of RF tags 200. In the example shown in FIGS. 7A and 7B, when the user holds RF tag 200 on which an appearance of some robot is printed is held over, identification information stored in RF tag 200 is read, and a robot object 234 corresponding to the read identification information is displayed on upper display module 110 of upper housing 101.

When a plurality of robots can be generated, a characteristic value thereof may be differed so that a strategic user experience to select a robot to be generated in accordance with a situation can be provided.

In the fourth application, a characteristic value for a generated robot is differed in accordance with a time difference between the timing (timing T3) at which exchange of data with RF tag 200 is enabled and the timing (timing T5) at which exchange of data with RF tag 200 is disabled. Namely, game device 100 increases or decreases influence on game processing depending on a calculated time difference.

In other words, in the fourth application, the timing (timing T3) at which exchange of data with RF tag 200 is enabled is set as the predetermined timing, and in game device 100, game processing proceeds in accordance with a time difference between the timing (timing T5) at which exchange of data with RF tag 200 is disabled and the timing (timing T3) at which exchange of data with RF tag 200 is enabled.

Namely, in the fourth application, depending on a duration of a state that data can be exchanged with RF tag 200 (timing T3 to T5), a characteristic value of the generated robot (for example, a power value, offensive strength, or defensive strength) or a size of a robot may be differed. Furthermore, depending on a duration of a state that data can be exchanged with RF tag 200 (timing T3 to T5), an appearance of a generated robot may develop.

Here, even when a type of a generated robot is different, the same characteristic value may be varied. Namely, whichever type of RF tag 200 may be held over, offensive strength may always be varied. In other words, game device 100 may vary a degree of change with regard to an identical characteristic value among objects handled in game processing, depending on information included in RF tag 200.

Alternatively, when a type of a generated robot is different, a characteristic value to be varied may be differed. For example, when RF tag 200 storing identification information 1 is held over, a robot corresponding to identification information 1 may be generated and a power value among the characteristic values may be varied. On the other hand, when RF tag 200 storing identification information 2 is held over, a robot corresponding to identification information 2 may be generated and offensive strength among the characteristic values may be varied. In other words, game device 100 may vary a degree of change with regard to a distinct characteristic value among objects handled in game processing, depending on information included in RF tag 200.

Depending on identification information stored in RF tag 200, a degree of change in characteristic value of a generated robot may be differed. Namely, a degree of influence on the game processing may be varied depending on information included in RF tag 200.

In the example shown in FIGS. 8A and 8B, as the time difference between the timing (timing T5) at which exchange of data with RF tag 200 is disabled and the timing (timing T3) at which exchange of data with RF tag 200 is enabled is greater, influence on game processing is greater. Specifically, as the duration of a state that data can be exchanged with RF tag 200 (timing T3 to T5) is longer, more energy is injected. As more energy is injected, a characteristic value of a robot is higher and a size of the robot is also greater.

Robot object 234 shown in FIG. 8B is greater than robot object 234 shown in FIG. 8A, which represents one example of change in form resulting from injection of energy as a result that RF tag 200 continues to be held over.

An amount of injection of energy is shown by a sub indicator object 232 different in manner of representation in an indicator object 230 indicating total energy. An object 238 representing a numeric value for an amount of injection of energy is displayed in proximity to object 230. While the user holds RF tag 200 over, a length of object 232 indicating an amount of injection of energy and a numeric value indicated by object 238 continue to increase.

In the fourth application, since the number of robots which can be generated and total energy which can be injected into each robot are both restricted, the user can enjoy strategies in which robot is to be generated at which timing by injecting how much energy. Namely, the user attempts to advantageously carry forward the play by generating a stronger robot or a weaker robot in accordance with a situation in the game.

Figure 9:
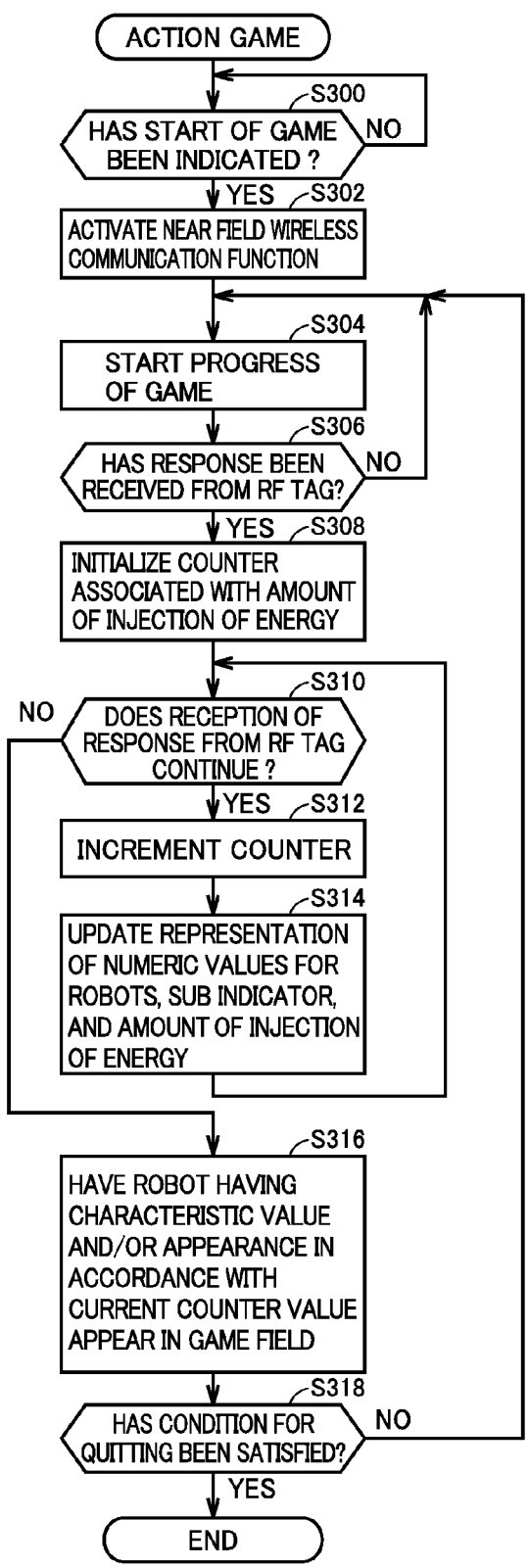
FIG. 9 shows an exemplary illustrative non-limiting drawing illustrating a flowchart showing a processing procedure in the fourth application executed in the game device according to the present embodiment.

Each step shown in FIG. 9 is implemented as CPU 13 (FIG. 1) executes an information processing program.

Referring to FIG. 9, when start of the game has been indicated (YES in step S300), CPU 13 of game device 100 initially activates the near field wireless communication function (step S302). When start of the game has not been indicated (NO in step S300), processing in step S300 is repeated. Thereafter, communication portion 11 (FIG. 1) arranged at a position in lower display module 120 continues to periodically emit pulses. Thus, game device 100 exchanges data with any proximate RF tag.

CPU 13 starts progress of the game (step S304) and determines whether or not response has been received from RF tag 200 (step S306). In progress of the game in step S304, various objects are arranged and a position of each object is successively updated under predetermined regularity. When robots come in contact with each other, energy of each robot may be decreased based on a characteristic value of each robot. Then, a robot of which energy has become zero disappears from a game field.

When no response has been received from RF tag 200 (NO in step S306), processing in step S306 is repeated.

In contrast, when response has been received from RF tag 200 (YES in step S306), CPU 13 has a screen for generating a robot (a screen for determining an amount of injection of energy) as shown in FIGS. 8A and 8B displayed. Then, CPU 13 initializes a counter associated with an amount of injection of energy (step S308).

When reception of response from RF tag 200 continues (YES in step S310), CPU 13 increments the counter (step S312) and updates a form of representation of robot object 234, sub indicator object 232, and object 238 representing a numeric value for an amount of injection of energy shown in FIGS. 8A and 8B (step S314). Then, processing in step S310 or later is repeated.

In contrast, when reception of response from RF tag 200 does not continue (NO in step S310), CPU 13 has a robot having a characteristic value and/or an appearance in accordance with a current counter value appear in the game field (step S316).

Thereafter, CPU 13 determines whether or not a condition for quitting the game processing has been satisfied (step S318). A condition for quitting this game processing may be an explicit or implicit instruction from the user, the fact that the remaining number of robots which can be generated has become zero, or a duration of the game processing reaching a predetermined value.

When a condition for quitting the game processing has not been satisfied (NO in step S318), processing in step S304 or later is repeated. In contrast, when the condition for quitting the game processing has been satisfied (YES in step S318), the game processing ends.

Through a processing procedure as above, the game processing in accordance with a time difference between the timing (timing T5) at which exchange of data with RF tag 200 is disabled and the timing (timing T3) at which exchange of data with RF tag 200 is enabled is performed. In other words, in game device 100, game processing proceeds in accordance with a duration of a state that data can be exchanged with RF tag 200. Namely, in the fourth application, an amount of injection of energy into a robot is varied in accordance with the time difference.

The fourth application is directed to an action game in which a robot is generated within predetermined limits, and the user strategically generates a robot through an action to hold RF tag 200 over/move RF tag 200 away. Therefore, strategies in an action to hold RF tag 200 over/move RF tag 200 away are competed for and a new user experience can be provided.

<c5: Modification of Application 4>

In the fourth application described above, though more energy is injected as a duration (timing T3 to T5) of a state that data can be exchanged with RF tag 200 is longer, an upper limit value for this injected energy may be provided. Namely, game processing performed in accordance with a time difference between the timing (timing T5) at which exchange of data with RF tag 200 is disabled and the timing (timing T3) at which exchange of data with RF tag 200 is enabled and/or a time difference between timing T4' determined by an application and the timing (timing T3) at which exchange of data with RF tag 200 is enabled will be described as a modification of the fourth application.

Figure 10:
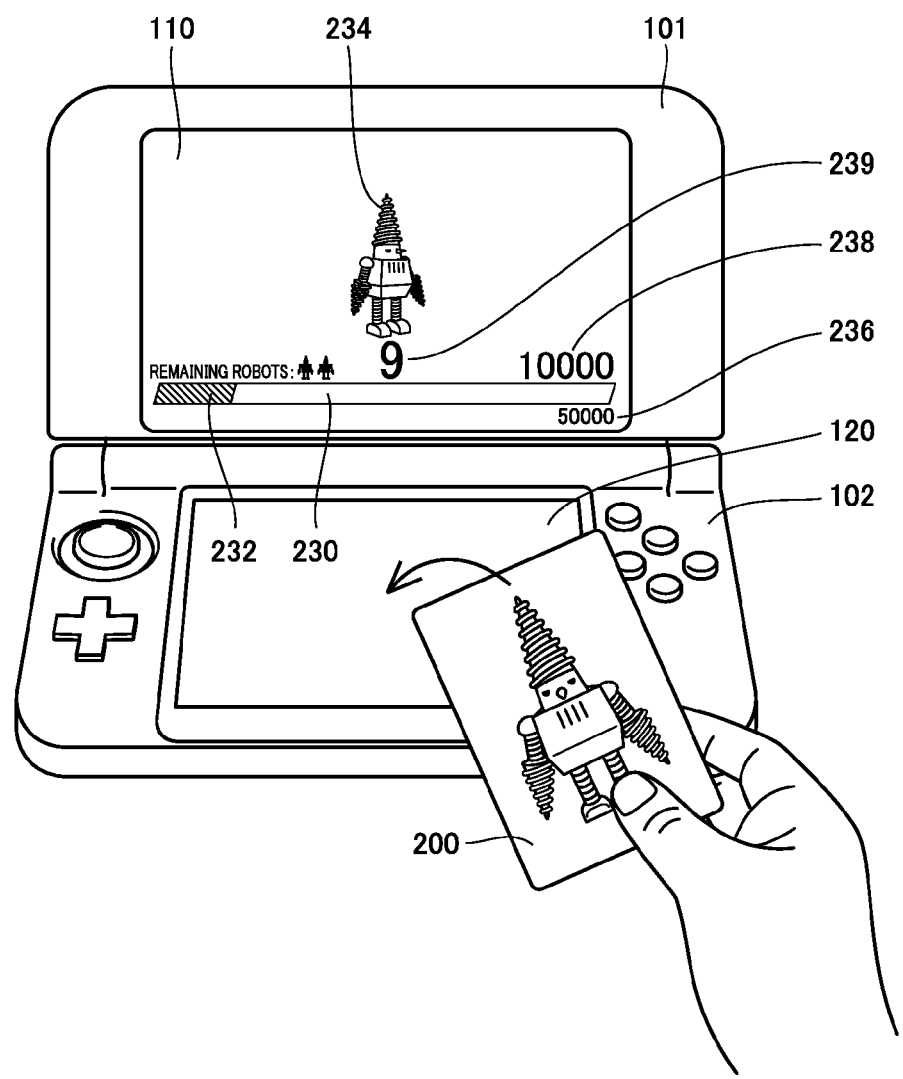
FIG. 10 shows an exemplary illustrative non-limiting drawing illustrating a schematic diagram showing a modification of the fourth application executed in the game device according to the present embodiment.

FIG. 10 shows a screen example of a state of injection of energy as the user holds RF tag 200 over. In the screen example shown in FIG. 10, an object 239 representing a period during which energy can be injected is displayed. Namely, object 239 represents a remaining time from the current time point until timing T4' (FIG. 2). Timing T4' is determined, with the timing (timing T3) at which exchange of data with RF tag 200 is enabled being defined as the reference. Namely, timing T4' is set to timing after the timing (timing T3) at which exchange of data with RF tag 200 is enabled.

For example, under such a rule that energy can be injected for 10 seconds from the timing (timing T3) at which the user held RF tag 200 over, when timing T3 is determined, timing T4' is set to 10 seconds after that. Namely, timing T4' is set to the timing after the timing (timing T3) at which exchange of data with RF tag 200 is enabled.

When timing T4' is reached, injection of energy is stopped even though the user continues to hold RF tag 200 over, that is, even though a state that data can be exchanged with RF tag 200 continues. Namely, the upper limit value for energy injected in each robot is clamped by timing T4'.

By clamping such an upper limit value of energy which can be injected, restriction on progress of the game is tighter and higher strategies are required of the user. Thus, a highly strategic, new user experience can be provided to the user.

Figure 11:
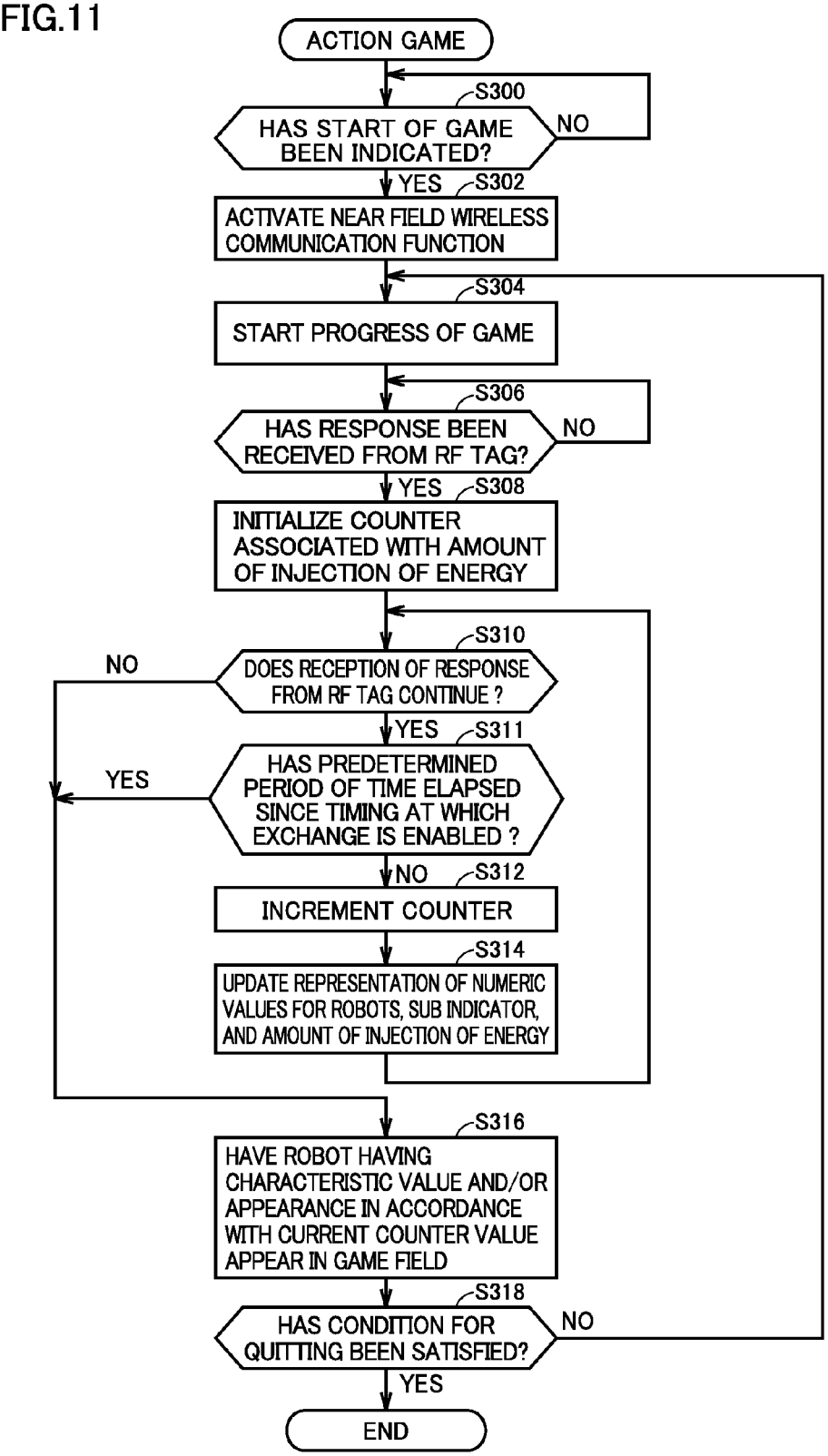
FIG. 11 shows an exemplary illustrative non-limiting drawing illustrating a flowchart showing a processing procedure in the modification of the fourth application executed in the game device according to the present embodiment.

A flowchart shown in FIG. 11 includes newly added processing in step S311 as compared with the flowchart shown in FIG. 9, and other steps are the same as corresponding steps in FIG. 9. Therefore, detailed description will not be repeated.

Referring to FIG. 11, when reception of response from RF tag 200 continues (YES in step S310), CPU 13 determines whether or not a predetermined period of time has elapsed since the timing at which exchange of data with RF tag 200 is enabled (step S311).

When a predetermined period of time has not elapsed since the timing at which exchange of data with RF tag 200 is enabled (NO in step S311), CPU 13 increments the counter (step S312) and updates a form of representation of robot object 234, sub indicator object 232, and object 238 representing a numeric value for an amount of injection of energy shown in FIGS. 8A and 8B (step S314). Then, processing in step S310 or later is repeated.

In contrast, when a predetermined period of time has elapsed since the timing at which exchange of data with RF tag 200 is enabled (YES in step S311), CPU 13 has a robot having a characteristic value and/or an appearance in accordance with a current counter value appear in the game field (step S316).

Through a processing procedure as above, game processing in accordance with a time difference between the timing (timing T5) at which exchange of data with RF tag 200 is disabled and the timing (timing T3) at which exchange of data with RF tag 200 is enabled and/or a time difference between timing T4' determined by an application and the timing (timing T3) at which exchange of data with RF tag 200 is enabled is performed.

<c6: Application 5>

Similarly to the fourth application described above, game processing performed in accordance with a time difference between the timing (timing T5) at which exchange of data with RF tag 200 is disabled and the timing (timing T3) at which exchange of data with RF tag 200 is enabled will be described as a fifth application.

Figure 12A:
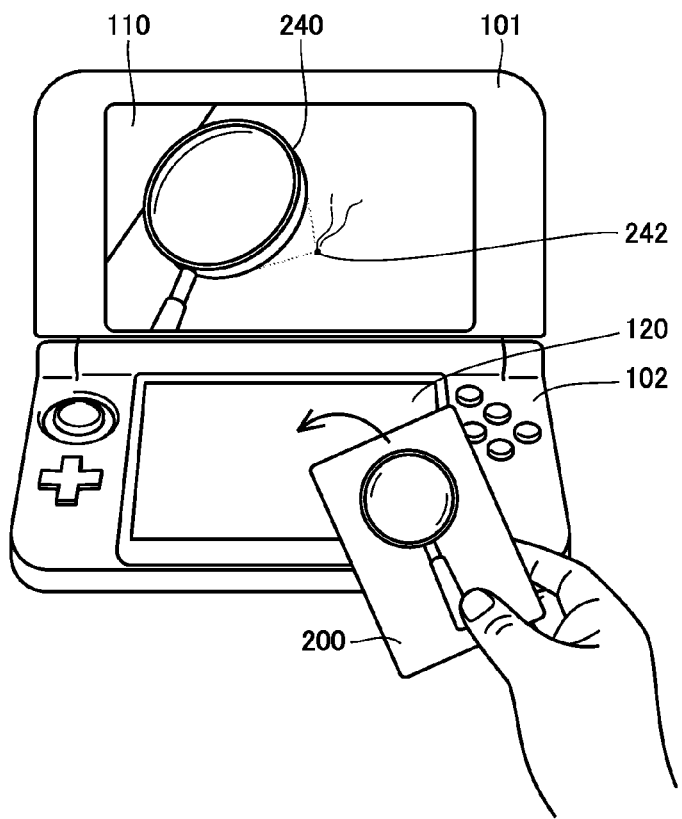
FIGS. 12A and 12B show exemplary illustrative non-limiting drawings each illustrating a fifth application executed in the game device according to the present embodiment.
Figure 12B:
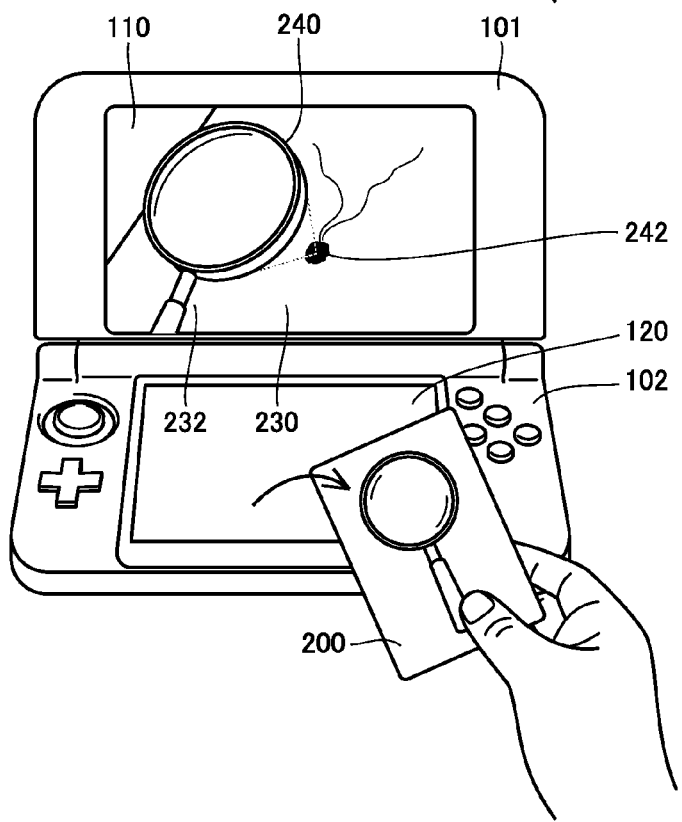

A fifth application shown in FIGS. 12A and 12B is a paper burning game. In a basic method of playing, a loupe object 240 is displayed on upper display module 110 of upper housing 101 and such an effect that paper burns only while the user holds RF tag 200 over is provided. As shown in FIG. 12A, at the time of start of holding RF tag 200 over, an object 242 representing a burnt part is relatively small, and as a period during which RF tag 200 is held over is longer, object 242 gradually becomes greater as shown in FIG. 12B.

Namely, in the example shown in FIGS. 12A and 12B, influence on the game processing is greater as the time difference between the timing (timing T5) at which exchange of data with RF tag 200 is disabled and the timing (timing T3) at which exchange of data with RF tag 200 is enabled is greater.

A plurality of RF tags 200 corresponding to loupes different in characteristics may be prepared, and when the user holds arbitrary selected RF tag 200 over, a loupe corresponding to that RF tag 200 may be displayed and a period during which paper is burnt or a size of a burnt part may be differed.

Since a processing procedure in the fifth application is similar to the processing procedure (FIG. 9) in the fourth application described above, detailed description will not be repeated.

In the fifth application, since such an effect that paper is burnt with the use of a loupe is continued while the user continues to hold RF tag 200 over, the user can be provided with a new user experience in which RF tag 200 is handled like a loupe. Namely, game processing in accordance with a time difference between the timing (timing T5) at which exchange of data with RF tag 200 is disabled and the timing (timing T3) at which exchange of data with RF tag 200 is enabled is performed.

In other words, in the fifth application, the timing (timing 3) at which exchange of data with RF tag 200 is enabled is set as the predetermined timing, and in game device 100, game processing proceeds in accordance with the time difference between the timing (timing T5) at which exchange of data with RF tag 200 is disabled and the timing (timing T3) at which exchange of data with the RF tag is enabled.

<c7: Application 6>

Game processing performed in accordance with a time difference between the timing (timing T5) at which exchange of data with RF tag 200 is disabled and the predetermined timing (timing T4 or timing T4') will now be described as a sixth application.

The sixth application shown in FIG. 13 is a golf game. In a basic method of playing the golf game, game processing proceeds with play by a single player or by a plurality of players. The user arranges a plurality of RF tags 200-1, 200-2, . . . , and 200-N before game device 100 as preparation. A golf club is printed on each RF tag 200 and each RF tag 200 stores also identification information for specifying a corresponding golf club. When any RF tag 200 is held over, game device 100 reads the identification information from RF tag 200 which has been held over, and determines which RF tag 200 on which a golf club is printed has been held over. For each golf club, a different characteristic value (a carry and an output angle of trajectory) is defined in advance.

On upper display module 110 of upper housing 101, together with a character 250 which plays golf, a meter object 252 representing power of each shot is displayed. When the user holds RF tag 200 over game device 100, an object 254 representing an indicator in object 252 starts reciprocating motion. The user selects RF tag 200 corresponding to an appropriate golf club with progress of the golf game and holds RF tag 200 over. While RF tag 200 is held over, reciprocating motion of the indicator (object 254) continues. When the user stops holding RF tag 200 over (that is, moves RF tag 200 away from game device 100), the indicator stops at that timing and power of the shot is determined based on a position of the stopped indicator (that is, a relative position in the meter). In the example shown in FIG. 13, highest power is allocated to each of opposing ends of the meter. Therefore, when the user desires to hit the ball as far as possible, the user moves RF tag 200 away, aiming at timing when the indicator is located at either opposing end of the meter. Alternatively, power of the shot is adjusted in accordance with a situation.

In the sixth application, timings T4 and T4' shown in FIG. 2 are periodically set with timing T3 being defined as the reference. Namely, as a time difference between the timing (timing T3) at which exchange of data with RF tag 200 is enabled and the timing (timing T5) at which exchange of data with RF tag 200 is disabled is closer to a multiple of a predetermined cycle, power of the shot is higher. In other words, game device 100 increases or decreases influence on game processing depending on a calculated time difference. Namely, game device 100 increases influence on the game processing as the time difference between the timing (timing T3) at which exchange of data with RF tag 200 is enabled and the predetermined timing (timing T4 or T4') is smaller.

A degree of change in power of a shot which is generated in association with a golf club may be differed depending on identification information stored in RF tag 200. Namely, a degree of influence on the game processing may be varied depending on information included in RF tag 200.

In the sixth application, the user can enjoy strategies in dropping in the cup with a lower score by appropriately selecting a golf club and/or adjusting power of a shot depending on a situation.

Figure 14:
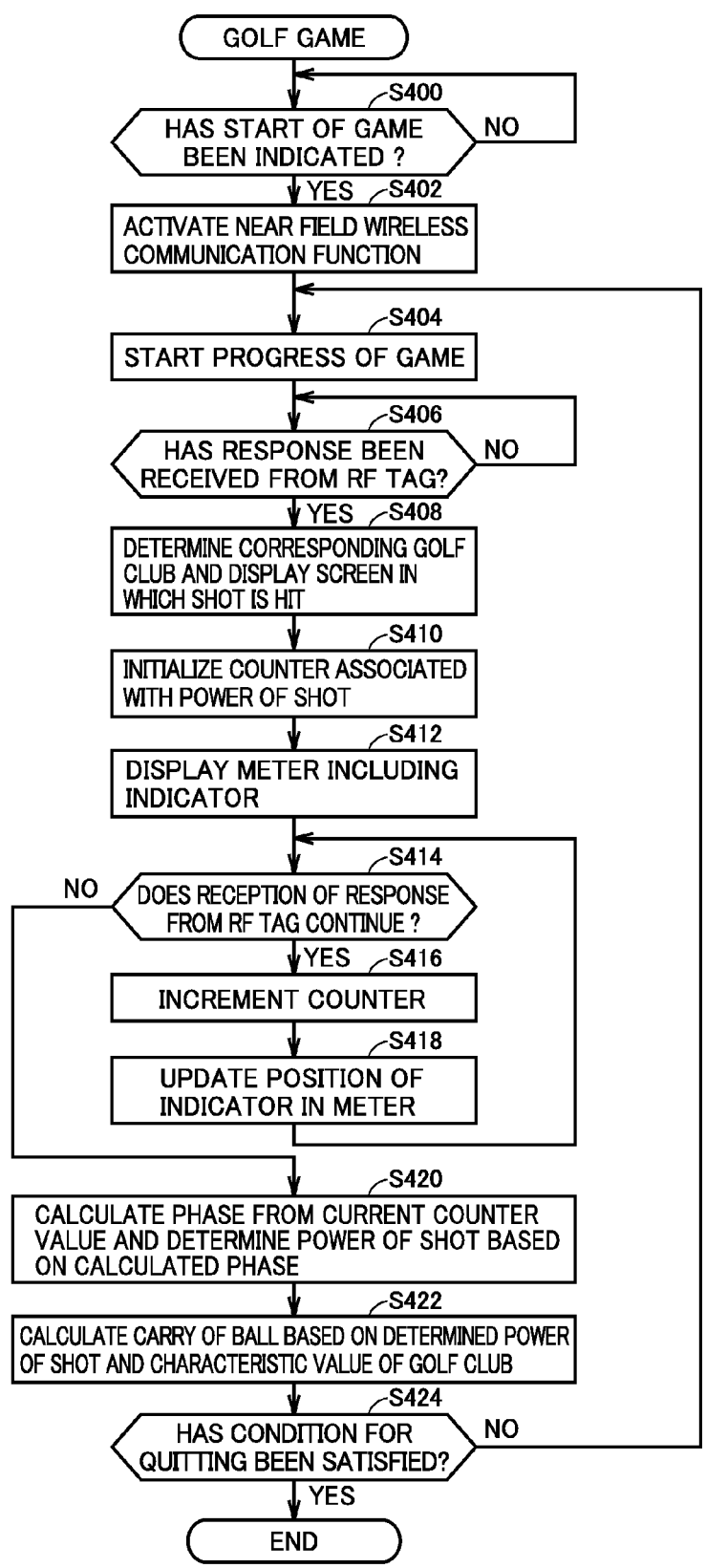
FIG. 14 shows an exemplary illustrative non-limiting drawing illustrating a flowchart showing a processing procedure in the sixth application executed in the game device according to the present embodiment.

Each step shown in FIG. 14 is implemented as CPU 13 (FIG. 1) executes an information processing program.

Referring to FIG. 14, when start of the game has been indicated (YES in step S400), CPU 13 of game device 100 initially activates the near field wireless communication function (step S402). When start of the game has not been indicated (NO in step S400), processing in step S400 is repeated. Thereafter, communication portion 11 (FIG. 1) arranged at a position in lower display module 120 continues to periodically emit pulses. Thus, game device 100 exchanges data with any proximate RF tag.

CPU 13 starts progress of the game (step S404) and determines whether or not response has been received from RF tag 200 (step S406). In progress of the game in step S404, an object associated with each hole is arranged, and after a shot is hit, a trajectory of a ball is calculated. A score of each user is also successively updated.

When no response has been received from RF tag 200 (NO in step S406), processing in step S406 is repeated.

In contrast, when response has been received from RF tag 200 (YES in step S406), CPU 13 determines a corresponding golf club based on identification information included in received response and has a screen in which a shot is hit as shown in FIG. 13 displayed (step S408). Then, CPU 13 initializes a counter associated with power of the shot (step S410) and has meter object 252 including object 254 representing the indicator shown in FIG. 13 displayed (step S412).

When reception of response from RF tag 200 continues (YES in step S414), CPU 13 increments the counter (step S416) and updates a position of the indicator in the meter (object 254 in FIG. 13) in accordance with the incremented counter (step S418). Then, processing in step S414 or later is repeated.

In contrast, when reception of response from RF tag 200 does not continue (NO in step S414), CPU 13 calculates a phase from the current counter value and determines power of the shot based on the calculated phase (step S420). By way of example, CPU 13 divides a duration of reception of response from RF tag 200 (a counter value T3-5) by a value indicating a predetermined cycle (a cycle C) and calculates the remainder (T3-5 mod C) as a phase. As this phase is smaller or greater, greater power is allocated.

Then, CPU 13 calculates a carry of the ball based on the determined power of the shot and the characteristic value of the selected golf club (step S422). An effect of flying of the ball in accordance with this calculated carry is displayed.

Thereafter, CPU 13 determines whether or not a condition for quitting the game processing has been satisfied (step S424). A condition for quitting this game processing may be an explicit or implicit instruction from the user or the fact that all users have holed out.

When a condition for quitting the game processing has not been satisfied (NO in step S424), processing in step S404 or later is repeated. In contrast, when the condition for quitting the game processing has been satisfied (YES in step S424), the game processing ends.

Through a processing procedure as above, the game processing is performed in accordance with a time difference between the timing (timing T5) at which exchange of data with RF tag 200 is disabled and the predetermined timing (timing T4 or timing T4'). From a different point of view, game processing in accordance with a time difference between the timing (timing T5) at which exchange of data with RF tag 200 is disabled and the timing (timing T3) at which exchange of data with RF tag 200 is enabled is performed.

In the sixth application, golf strategically proceeds by selecting an appropriate golf club and adjusting power of a shot through an action to hold RF tag 200 over/move RF tag 200 away. Therefore, strategies in an action to hold RF tag 200 over/move RF tag 200 away are competed for and a new user experience can be provided.

[D. Cycle of Pulse Emission]

As described above, in game device 100 according to the present embodiment, game processing in accordance with a time difference between timings originating from an action by the user to hold RF tag 200 over/move RF tag 200 away proceeds. From a point of view of improvement in user experience, such a time difference is preferably calculated more accurately. Namely, responsiveness to a user action is preferably enhanced.

Then, when a time difference (or timing) determining progress of game processing as described above is detected, a frequency (a cycle) of exchange of information with RF tag 200 may be made higher than in other cases.

Figure 15:
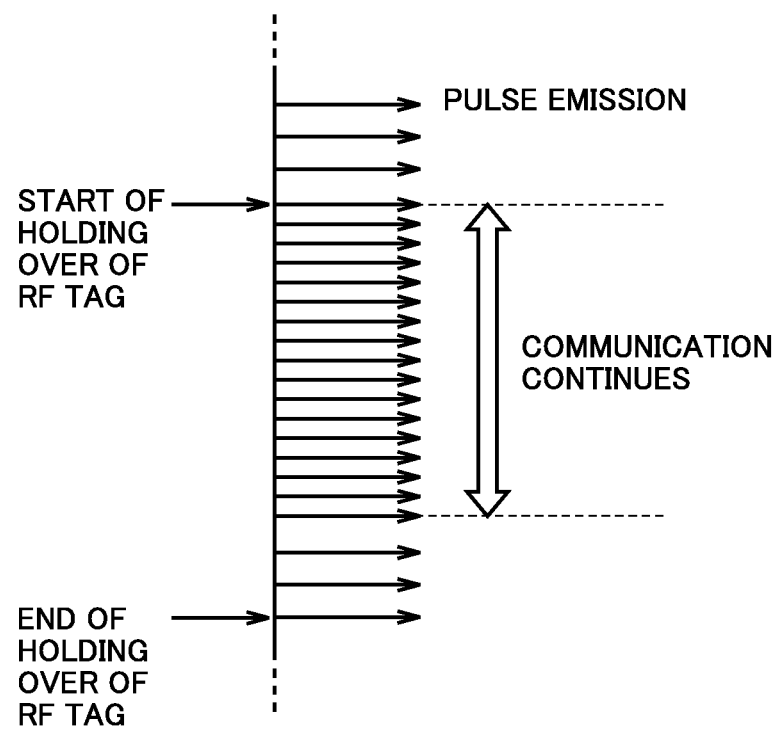
FIG. 15 shows an exemplary illustrative non-limiting drawing illustrating a processing procedure involved with reading of an RF tag in the game device according to the present embodiment.

Referring to FIG. 15, when the user starts to hold RF tag 200 over, that is, when exchange of data with RF tag 200 is started, game device 100 makes a cycle of pulse emission shorter than a preceding cycle. Then, during a period in which data can be exchanged with RF tag 200 (a duration of communication), game device 100 continues to emit pulses in a shorter cycle. By making a cycle of such pulse emission shorter, the timing at which the user moves RF tag 200 away from game device 100 can be detected at higher accuracy.

Though FIG. 15 shows a processing example in which a frequency of emission of pulses is made shorter at the time when exchange of data with RF tag 200 is started, limitation thereto is not intended. For example, a frequency of emission of pulses may be made shorter at the time when game processing is started. By adopting this scheme, the timing at which the user holds RF tag 200 over game device 100 can be detected at higher accuracy.

[E. Other Forms]

In each application example described above, a configuration for reading identification information from one RF tag 200 has been exemplified. When a plurality of pieces of identification information are read at once, read identification information may arbitrarily be combined so as to perform one process or a plurality of processes described above.

[F. Advantages]

In game device 100 according to the present embodiment, game processing is controlled through an operation by a user such as holding RF tag 200 over/moving RF tag 200 away. Namely, in the present embodiment, rather than differing progress of a game by means of an information processing program, game processing can proceed as the user himself/ herself directly performs an operation with the use of RF tag 200. Thus, even though the same RF tag 200 is held over, a new user experience such as variation in representation of an object in accordance with a time period during which the RF tag is held over can be provided, or a new user experience in which skills of the user are competed for by using a timing technique to move RF tag 200 away can be provided.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program executed by a computer with a near field wireless communication function, the information processing program causing the computer to perform the acts comprising:
    exchanging data with an information storage medium through near field wireless communication with the information storage medium; and
    performing predetermined processing in accordance with a time difference between predetermined timing and one of timing at which exchange of data with the information storage medium is enabled and timing at which exchange of data with the information storage medium is disabled,
    wherein the predetermined timing is a timing that is different from both 1) the timing at which exchange of data with the information storage medium is enabled and 2) timing at which exchange of data with the information storage medium is disabled.

2. The non-transitory storage medium according to claim 1, wherein
    the processing includes setting the timing at which exchange of data with the information storage medium is enabled as the predetermined timing and performing the predetermined processing in accordance with a time difference between the timing at which exchange of data with the information storage medium is disabled and the timing at which exchange of data with the information storage medium is enabled.

3. The non-transitory storage medium according to claim 2, wherein a parameter that is used in performing the predetermined processing is increased as a function of an increase in the calculated time difference.

4. The non-transitory storage medium according to claim 3, wherein a value of the parameter is varied depending on information included in the information storage medium.

5. The non-transitory storage medium according to claim 4, wherein the parameter is common across multiple different object types that are generated or handled by the predetermined processing.

6. The non-transitory storage medium according to claim 4, wherein
    the processing includes varying a degree of change with regard to a distinct characteristic value among objects handled in the predetermined processing, depending on the information included in the information storage medium.

7. The non-transitory storage medium according to claim 2, wherein a magnitude of a factor that is used in the predetermined processing is increased or decreased depending on the calculated time difference.

8. The non-transitory storage medium according to claim 1, wherein
    the predetermined timing is set to timing after the timing at which exchange of data with the information storage medium is enabled.

9. The non-transitory storage medium according to claim 8, wherein
    the processing includes increasing influence on the predetermined processing as a time difference between the timing at which exchange of data with the information storage medium is disabled and the predetermined timing is smaller.

10. The non-transitory storage medium according to claim 8, wherein
    the processing includes varying a degree of influence on the predetermined processing depending on information included in the information storage medium.

11. The non-transitory storage medium according to claim 10, wherein
    the processing includes varying a degree of change with regard to an identical characteristic value among objects handled in the predetermined processing, depending on the information included in the information storage medium.

12. The non-transitory storage medium according to claim 10, wherein
    the processing includes varying a degree of change with regard to a distinct characteristic value among objects handled in the predetermined processing, depending on the information included in the information storage medium.

13. The non-transitory storage medium according to claim 1, wherein the information storage medium is an RF tag.

14. The non-transitory storage medium according to claim 1, wherein
    the information processing program is a game program.

15. The non-transitory storage medium of claim 1, wherein the predetermined timing is determined by an application program executable by the computer.

16. The non-transitory storage medium of claim 15, wherein the predetermined timing is a timing that is between the timing at which exchange of data with the information storage medium is enabled and 2) timing at which exchange of data with the information storage medium is disabled.

17. The non-transitory storage medium of claim 15, wherein the predetermined timing is a timing that is after or before both of the timing at which exchange of data with the information storage medium is enabled and 2) timing at which exchange of data with the information storage medium is disabled.

18. An information processing apparatus, comprising:
    a communication portion which exchanges data with an information storage medium through near field wireless communication with the information storage medium; and
    a processing module which performs predetermined processing in accordance with a time difference between predetermined timing and one of timing at which exchange of data with the information storage medium is enabled and timing at which exchange of data with the information storage medium is disabled,
    wherein the predetermined timing is a timing that is different from both 1) the timing at which exchange of data with the information storage medium is enabled and 2) timing at which exchange of data with the information storage medium is disabled.

19. An information processing system, comprising:
a communication portion which exchanges data with an information storage medium through near field wireless communication with the information storage medium; and
a processing module, the processing module performing, by executing an information processing program stored in the storage medium, predetermined processing in accordance with a time difference between predetermined timing and one of timing at which exchange of data with the information storage medium is enabled and timing at which exchange of data with the information storage medium is disabled,
wherein the predetermined timing is a timing that is different from both 1) the timing at which exchange of data with the information storage medium is enabled and 2) timing at which exchange of data with the information storage medium is disabled.

20. An information processing method performed by a computer with a near field wireless communication function, comprising:
exchanging data with an information storage medium through near field wireless communication with the information storage medium; and
performing predetermined processing in accordance with a time difference between predetermined timing and one of timing at which exchange of data with the information storage medium is enabled and timing at which exchange of data with the information storage medium is disabled,
wherein the predetermined timing is a timing that is different from both 1) the timing at which exchange of data with the information storage medium is enabled and 2) timing at which exchange of data with the information storage medium is disabled.

* * * * *